(12) United States Patent
Scarano et al.

(10) Patent No.: US 8,055,503 B2
(45) Date of Patent: Nov. 8, 2011

(54) METHODS AND APPARATUS FOR AUDIO DATA ANALYSIS AND DATA MINING USING SPEECH RECOGNITION

(75) Inventors: Robert Scarano, Monroe, CT (US); Lawrence Mark, Trumbull, CT (US)

(73) Assignee: Siemens Enterprise Communications, Inc., Boca Raton, FL (US)

(*) Notice: Subject to any disclaimer, the term of this patent is extended or adjusted under 35 U.S.C. 154(b) by 385 days.

(21) Appl. No.: 11/590,772

(22) Filed: Nov. 1, 2006

(65) Prior Publication Data
US 2007/0083370 A1    Apr. 12, 2007

Related U.S. Application Data

(63) Continuation of application No. 10/687,703, filed on Oct. 20, 2003, now Pat. No. 7,133,828.

(60) Provisional application No. 60/419,738, filed on Oct. 18, 2002.

(51) Int. Cl.
*G10L 11/00* (2006.01)

(52) U.S. Cl. ........ 704/270; 704/231; 704/240; 704/243; 704/245; 704/252

(58) Field of Classification Search .................. None
See application file for complete search history.

(56) References Cited

U.S. PATENT DOCUMENTS

| | | | |
|---|---|---|---|
| 5,535,256 A | 7/1996 | Maloney et al. | |
| 5,600,831 A | 2/1997 | Levy et al. | |
| 5,638,489 A | 6/1997 | Tsuboka | |
| 5,649,060 A * | 7/1997 | Ellozy et al. | 704/9 |
| 5,649,068 A | 7/1997 | Boser et al. | |
| 5,671,333 A | 9/1997 | Catlett et al. | |
| 5,675,710 A | 10/1997 | Lewis | |
| 5,822,401 A | 10/1998 | Cave et al. | |
| 5,864,855 A | 1/1999 | Ruocco et al. | |
| 5,884,259 A | 3/1999 | Bahl et al. | |
| 6,061,652 A | 5/2000 | Tsuboka et al. | |
| 6,064,963 A | 5/2000 | Gainsboro | |
| 6,073,103 A | 6/2000 | Dunn et al. | |
| 6,185,527 B1 | 2/2001 | Petkovic et al. | |
| 6,219,643 B1 | 4/2001 | Cohen et al. | |
| 6,243,676 B1 | 6/2001 | Witteman | |
| 6,249,765 B1 | 6/2001 | Adler et al. | |
| 6,263,049 B1 | 7/2001 | Kuhn | |
| 6,278,772 B1 | 8/2001 | Bowater et al. | |
| 6,345,252 B1 | 2/2002 | Beigi et al. | |
| 6,404,856 B1 | 6/2002 | Wilcox | |

(Continued)

FOREIGN PATENT DOCUMENTS

EP    0 833 489    4/1998

(Continued)

OTHER PUBLICATIONS http://www.fast-talk.com (3 pages), archived Aug. 16, 2004.

(Continued)

*Primary Examiner* — Leonard Saint Cyr

(57) ABSTRACT

A system and method provide an audio analysis intelligence tool with ad-hoc search capabilities using spoken words as an organized data form. An SQL-like interface is used to process and search audio data and combine it with other traditional data forms to enhance searching of audio segments to identify those audio segments satisfying minimum confidence levels for a match.

8 Claims, 19 Drawing Sheets

U.S. PATENT DOCUMENTS

| | | | |
|---|---|---|---|
| 6,408,064 B1 | 6/2002 | Fedorov et al. | |
| 6,408,270 B1 | 6/2002 | Garber | |
| 6,434,520 B1 | 8/2002 | Kanevsky et al. | |
| 6,542,602 B1 | 4/2003 | Elazar | |
| 6,603,854 B1 | 8/2003 | Judkins et al. | |
| 6,603,921 B1 | 8/2003 | Kanevsky | |
| 6,633,845 B1 * | 10/2003 | Logan et al. | 704/255 |
| 6,697,796 B2 | 2/2004 | Kermani | |
| 7,020,612 B2 * | 3/2006 | Tamura | 704/275 |
| 7,054,812 B2 * | 5/2006 | Charlesworth et al. | 704/251 |
| 7,096,218 B2 | 8/2006 | Schirmer et al. | |
| 7,177,795 B1 * | 2/2007 | Chen et al. | 704/9 |
| 7,263,484 B1 * | 8/2007 | Cardillo et al. | 704/236 |
| 2001/0040942 A1 | 11/2001 | Glowny et al. | |
| 2001/0049601 A1 | 12/2001 | Kroeker et al. | |
| 2002/0046029 A1 * | 4/2002 | Tamura | 704/251 |
| 2002/0051522 A1 | 5/2002 | Merrow et al. | |
| 2002/0055950 A1 | 5/2002 | Witteman | |
| 2002/0147592 A1 | 10/2002 | Wilmont et al. | |
| 2002/0156776 A1 | 10/2002 | Davallou | |
| 2002/0161570 A1 | 10/2002 | Loofbourrow et al. | |
| 2003/0048882 A1 * | 3/2003 | Smith, II | 379/88.14 |
| 2003/0083876 A1 | 5/2003 | Lin | |
| 2003/0110032 A1 * | 6/2003 | Seide | 704/240 |
| 2004/0024599 A1 | 2/2004 | Deisher | |
| 2004/0034649 A1 | 2/2004 | Czarnecki et al. | |
| 2004/0249650 A1 | 12/2004 | Freedman et al. | |
| 2007/0011008 A1 | 1/2007 | Scarano et al. | |
| 2007/0083370 A1 | 4/2007 | Scarano et al. | |

FOREIGN PATENT DOCUMENTS

EP      0 833 489 A2      4/1998

OTHER PUBLICATIONS http://www.aurix.com (30 pages), archived Jul. 3, 2004.
www.nexidia.com (44 pages), archived Jun. 3, 2004.
International Search Report issued in International Application No. PCT/US04/27372, mailed May 31, 2005.
Nasuwaka et al., "Text Analysis and Knowledge Mining System," IBM Systems Journal, vol. 40, No. 4, pp. 967-984 (2001).
Supplemental European Search Report issued in European Application 04781960.2, mailed Jul. 8, 2008.
Written Opinion issued in International Application PCT/US04/27372, mailed May 31, 2005.
International Search Report issued in International Application PCT/US03/33042, mailed May 25, 2004.
Written Opinion issued in International Application PCT/US03/33042, mailed Aug. 3, 2004.
Clements et al., Phonetic Searching Applied to On-Line Distance Learning Modules, IEEE Signal Processting Society 10 th Digital Signal processing Workshop, Oct. 13-16, 2002, pp. 186-191.
Li et al., "MOQL: A Multimedia Object Query Language," Third International Workshop on Multimedia Information Systems, Como, Italy, Sep. 1996, 10 pages.
International Preliminary Examination Report issued in International Application PCT/US03/33042, mailed Mar. 18, 2005.
Supplemental European Search Report issued in European Application 03 80 9142, mailed Dec. 5, 2005.
Clements et al., "Phonetic Searching of Digital Audio," Broadcast Engineering Conference Proceedings, 2001, pp. 1-10, Las Vegas, US. VorTecs Uses Fast-Talk to Pow r Intelligent Communication Solutions, pp. 1-3.
Geoffrey Giordano, "Integrating a Call Logger Into the Modern Contact Center," Dec. 3, 2001, pp. 1-6.
Jeffrey Kingdon, "Computer Telephony Integration," Nov. 28, 2001, pp. 1-7.
International Search Report issued in International Application PCT/US03/33040, mailed Jun. 2, 2004.
Written Opinion issued in International Application PCT/US03/33040, mailed Oct. 12, 2004.
International Preliminary Report on Patentability issued in International Application PCT/US03/33040, mailed Mar. 17, 2005.
First Examination Report issued in Indian Application 282/MUMNP/2005.
Second Examination Report issued in Indian Application 282/MUMNP/2005, mailed Dec. 12, 2005.
Supplemental European Search Report issued in European Application 03 77 4874.6, mailed Dec. 5, 2005.
European Office Action issued in European Application 03 774 874.6, mailed Dec. 11, 2006.
Steven Wartik,. "Boolean Operations," in: Frakes et al. "Information Retrieval Data Structures & Algorithms," 1992 Prentice Hall pp. 264-268.
Examiner's Report issued in Australian Application 2003301373, mailed Feb. 25, 2008.
Examiner's Report issued in Australian Application 2003282940, mailed Aug. 6, 2008.
Notice of Allowance issued in U.S. Appl. No. 10/687,703, mailed May 23, 2006.
Advisory Action issued in U.S. Appl. No. 10/687,703, mailed Oct. 12, 2005.
Final Office Action issued in U.S. Appl. No. 10/687,703, mailed Mar. 23, 2005.
Office Action issued in U.S. Appl. No. 10/687,703, mailed Aug. 2, 2004.
Office Action issued in U.S. Appl. No. 11/590,772, mailed May 28, 2008.
Office Action issued in U.S. Appl. No. 11/482,876, mailed Feb. 1, 2008.
First Examination Report issued in Indian Application 283/MUMNP/2005, mailed Jan. 5, 2006.
Second Examination Report issued in Indian Application 283/MUMNP/2005, mailed Nov. 2, 2006.
Final Office Action issued in U.S. Appl. No. 11/482,876 mailed Oct. 29, 2008.
Office Action issued in U.S. Appl. No. 10/923,038 mailed Nov. 7, 2008.
European Search Report issued in European Application No. 99 10 8354.4, mailed Dec. 8, 1999.
Carlos Reyes et al., "A Clustering Technique for Random Data Classification" International Conference on Systems, Man and Cybernetics, US, New York, IEEE, pp. 316-321 (1995).
Ellen Voorhees et al., Vector Expansion in a Large Collection:, NIST Special Publication, pp. 343-351.
Mario Marchand et al., "A Convergence Theorem for Sequential Learning in Two-Layer Perceptrons", Europhysics Letters, vol. 11, No. 6, pp. 487-492 (1990).
International Search Report issued in International Application No. PCT/US04/27372, mailed May 31, 2005.
Notice of Allowance issued in U.S. Appl. No. 10/923,038, mailed May 21, 2008.
Office Action issued in U.S. Appl. No. 10/923,038, mailed Oct. 30, 2007.
Notice of Allowance issued in U.S. Appl. No. 10/687,702, mailed Jan. 19, 2006.
Final Office Action issued in U.S. Appl. No. 10/687,702, mailed Mar. 24, 2005.
Office Action issued in U.S. Appl. No. 10/687,702, mailed Oct. 6, 2004.
Office Action issued EP 03 809 142.7, mailed Oct. 7, 2010.
William B. Frankes et al., "Information Retrieval: Data Structures & Algorithms", Prentice Hall, Englewood Cliffs, NJ, Copyright 1992.
"VorTecs Uses Fast-Talk to Power Intelligent Communication Solutions" pp. 1-3.
Geoffrey Giordano, "Integrating a Call Logger Into the Modern Contact Center", Dec. 3, 2001, pp. 1-6.
Jeffrey Kingdon, "Computer Telephony Integration", Nov. 28, 2001, pp. 1-7.
Frakes et al., "Information Retrieval Data Structures & Algorithms", Prentice-Hall, 1992, ISBN 0-13-463837-9, pp. 264-268.
Clements et al., "Phonetic Searching of Digital Audio", Fast-Talk Communications, Inc. [retrieved Aug. 4, 2002]. Retreived from the Internet: <http://web.archive.org/we/*/www.fast-atlk.com/technology_how.html>, pp. 1-10.
Clements, et al., "Phonetic Searching Applied To On-Line Distance Learning Modules," IEEE signal Processing Society 10th Digital Signal Processing Workshop, Oct. 13-16, 2002.
Li et al., "MOQL: A Multimedia Object query Language", third International Workshop on Multimedia Information Systems, Como, Italy, Sep. 1996.

* cited by examiner

Figure 17

METHODS AND APPARATUS FOR AUDIO DATA ANALYSIS AND DATA MINING USING SPEECH RECOGNITION

CROSS-REFERENCE TO RELATED APPLICATIONS

The present application is a continuation of U.S. patent application Ser. No. 10/687,703 filed Oct. 20, 2003 now U.S. Pat. No. 7,133,828 which is a continuation of U.S. Provisional Patent Application 60/419,738 filed Oct. 18, 2002 and is related to U.S. Provisional Patent Applications 60/496,916 entitled System For And Method Of Automated Quality Monitoring filed Aug. 22, 2003 and 60/419,737 entitled Methods and Apparatus for Audio Data Monitoring and Evaluation Using Speech Recognition filed Oct. 18, 2002, and the Continuation-in-Part application Ser. No. 10/687,702 of the latter by the same title and filed Oct. 20, 2002, all of which are incorporated herein by reference in their entireties.

BACKGROUND OF THE INVENTION

1. Field of the Invention

The present invention relates to the field of audio data monitoring, such as the monitoring of telephone calls and, more specifically, to leveraging voice recognition technology to provide new and improved features and functionality for use in audio data analysis and data mining. Such new and improved features and functionality include speech and data SQL integration for fast and efficient searches of audio data for spoken words, phrases, or sequences of words, as well as other features and functions described herein.

2. Description of Related Art

Prior art telephone call monitoring typically consisted of recording telephone calls and the manual monitoring of only a select few (e.g., 5%) of the recorded calls by a call center employee or supervisor. Searching for particular words or phrases must be performed manually by listening to segments of audio recordings. Such manual call monitoring is tedious, time consuming, laborious, and costly.

Call monitoring is often included as part of modern call or contact center supported by modern Computer Telephony Integration (CTI) systems. CTI is an indispensable component of doing business over the telephone, CTI middleware providing a software bridge between computers and telephone systems in contact centers. CTI functions to bringing together computer systems and telephone systems so that their functions can be coordinated. Functionality made possible by core CTI technology include: Interactive Voice Response (IVR) integration, which transfers caller-entered IVR information to Customer Support Representative (CSR) desktop PCs, Screen Pop and coordinated call-data transfer between CSRs. By integrating computers and telephone systems, contact centers can realize significant advances in both CSR productivity and the quality of customer service.

CTI applies computer-based intelligence to telecommunications devices, blending the functionality of computers and computer networks with the features and capabilities of sophisticated telephone systems over an intelligent data link to gain increases in CSR productivity, customer satisfaction and enterprise cost savings. CTI combines the functionality of programmable computing devices with the telephony network through the exchange of signaling and messaging data between the switching systems and a computer. CTI's principal undertaking is to integrate various call center systems and platforms, including PBXs, LANs, IVR/VRU systems, predictive dialers, the desktop PC and Internet-based applications.

Three functions—IVR integration, screen pop and coordinated call-data—transfer lie at the core of most CTI implementations. A common CTI function is the "screen pop" or "smart call handling". The screen pop uses telephony-supplied data typically ANI (automatic number identification), DNIS (dialed number identification service) and/or IVR-entered data to automatically populate a CSR's desktop application screen with information related to the transaction, such as a customer's profile or account information, scripts or product information. When the CSR answers the phone, he or she knows who is calling and is better positioned to provide effective customer service. Closely related to the screen pop application is an application often referred to as "coordinated call-data transfer." A typical scenario for this application might proceed as follows. A Tier 1 CSR receives a customer call. The Tier 1 CSR realizes that the customer will have to be transferred to a Tier 2 CSR to satisfy the customer inquiry. With a few clicks of the mouse, coordinated call-data transfer functionality allows the transferring CSR to send both the call and the updated screen data to the receiving CSR. With all of the information relating to the first transaction, the receiving CSR has more data and is able to more efficiently and effectively conduct the next customer interaction.

IVR integration typically rounds out most basic CTI implementations. With IVR integration, information a customer enters into an IVR system is automatically displayed on a CSR's desktop PC when the customer elects to speak directly to a CSR. At the same time, information collected by the IVR system can be used to trigger a screen pop. With this functionality, customers are relieved from having to repeat basic information when transferring to a live CSR. The customer is able to carry on with the live CSR where he or she left off with the IVR system.

CTI functionality has four principal benefits including (i) increased CSR productivity; (ii) more competent customer service; (iii) faster access to customer information; and (iv) long distance cost savings. With CTI, CSR productivity increases significantly. CSRs are relieved from having to ask customers for routine information or for information the customer has already provided, either to another CSR or to another call center device. Time spent keying in database access information and waiting for resulting information is eliminated. With these process improvements, the overall call processing time is reduced, allowing CSRs to process more calls more efficiently in the course of a typical day. With screen pop functionality alone, the typical call center should be able to realize a 10 to 15 second reduction in average call processing times. The screen pop functionality offers a significant savings to a contact center when implementing "core" CTI functionality. When there are frequent transfers of customer's calls, either from an IVR system or between CSRs, the reduction in average call processing times can be even greater.

Another benefit of CTI is the ability to deliver more competent customer service. With core CTI functionality, customers are recognized by name as soon as they reach a live CSR. In addition, customers are relieved from having to repeat routine information every time they are transferred to a different call center location. To the customer, CTI is transparent, as it provides the customer with a seamless interaction, and giving the customer a favorable impression of the organization as a competent, customer-focused operation.

CTI further supports upselling and cross-selling existing customers. Having fast access to customer information is a critical requirement to being able to upsell and cross-sell effectively. By allowing CSRs to access customer information as they make voice contact with the customer, CSRs are better able to plan up-sale and cross-sale proposals.

An additional benefit of CTI is reduced long distance charges per call. CTI allows the call center to process calls faster, the technology can result in considerable reductions of long distance charges.

With reference to FIG. 1, a typical call or Contact Center 100 may include a switch 102 such as an Automatic Call Distributor (ACD) and/or Private Branch Exchange (PBX) connected to a communications network, such as the Public Switched Telephone Network (PSTN) for receiving calls from and making calls to customer telephones 101. Switch 102 is connected to and cooperates with Interactive Voice Response system 103 for automatically handling calls (e.g., playing messages to and obtaining information from callers, etc.) and with CTI Server 104 for routing calls to CSRs. CTI Server 104 is also connected to Switch 102 for receiving call information such as DNIS and ANI, and to CSR Workstation 105 for providing information to a CSR. CSR Workstation 105 may connect to Database 106 directly and/or receive information form Database 106 through CTI Server 104 when an appropriate connection (not shown) is available. A CSR has access both to CSR Workstation 105 and to CSR Telephone 107 for conversing with customers and retrieving data from and inputting data into Database 106 and performing other call handling actions using CTI Server 104, IVR 103 and Switch 102.

Referring to FIG. 1, a typical call processing session may proceed as follows.

1.) A customer call from telephone 101 comes into ACD/PBX switch 102.

2.) The call gets routed to IVR 103.

2a). Switch 102 sends ANI, DNIS to CTI Server 104.

3.) IVR 103 requests call data from CTI Server 104.

3a.) The call data is sent to IVR 103 from CTI Server 104.

4.) IVR 103 and Caller exchange information.

5.) IVR 103 sends call data to the CTI Server 104.

5a.) IVR 103 transfers the call back to Switch 102.

6.) CSR Workstation 105 requests data and the CTI Server 104 sends it.

7.) Data sent to CSR Workstation 105 triggers a call to Customer Database 106.

8.) The data from the caller data triggers a call to the Customer Database 106 to populate the CSR Screen 105 with the customer data as the voice arrives.

One of the tasks in running a call or Contact Center is to ensure that the system is properly operating and that each CSR is trained and efficiently handles interactions with customers. Such quality assurance tasks are often supported by call monitoring systems and methods. For example, U.S. Pat. No. 5,535,256 entitled Method And System For Automatically Monitoring The Performance Quality Of Call Center Service Representatives issued Jul. 9, 1996 to Maloney et al. describing a method and system for monitoring the performance of a CSR in servicing calls in a call center by determining an interval within which to monitor the service representative's performance in responding to calls, as well as by determining a number of calls or length of time for monitoring the representative within the interval. U.S. Pat. No. 6,263,049 entitled Non-Random Call Center Supervisory Method and Apparatus issued Jul. 17, 2001 to Kuhn describing a computer-implemented method and apparatus for monitoring of CSR calls in a non-random fashion in order to provide a supervisor with flexible control over monitoring schedules. U.S. Pat. No. 6,408,064 entitled Method and Apparatus for Enabling Full Interactive Monitoring of Calls To and From a Call-In Center issued Jun. 18, 2002 to Fedorov et al., describing a CSR station at a telephone call center with a telephone speaker line connected to a microphone input at the sound card. These CSR stations are interconnected on a LAN such that a supervisor at one station may monitor telephone conversations at another station. U.S. Pat. No. 6,542,602 entitled Telephone Call Monitoring System issued Apr. 1, 2003 to Elazar describing a method of monitoring CSR telephonic interactions with customers including a) receiving a CTI datum associated with a telephone call between a CSR and a party, b) determining whether the telephone call is to be recorded by determining whether the CTI datum meets at least one predefined monitoring condition, and, if so, c) recording at least a portion of the telephone call.

While these prior art systems provide some degree of CSR monitoring and system quality assurance, improved methods and systems are needed to enhance monitoring functions, collect information, and support review and analysis of quality assurance and monitoring data.

BRIEF SUMMARY OF THE INVENTION

According to one aspect of the invention, a method of searching audio data, comprises the steps of defining a phrase to use for searching; defining a minimum confidence level for searching; searching a set of audio segment for the phrase; and producing a set of results of all occurrences of the phrase within the audio segments and the confidence that a given occurrence is a match for the search phrase. The "target" phrase to be found in the audio segment may include one or some combination of phrases, e.g., utterances, words, phonemes, etc. The minimum confidence level may set forth a threshold value that may be statically or dynamically defined based on various criteria.

According to a feature of the invention, the step of defining may include defining a plurality of phrases, with the step of searching including searching the set of audio segments for the plurality of phrases, while the step of producing includes producing a set of results of all occurrences of the plurality of phrases identified in a specified sequential order within the audio segments with the minimum confidence that a given occurrence within the audio segments is a match for a corresponding one of the plurality of search phrases.

According to another feature of the invention, the step of defining may include defining a plurality of phrases, the step of searching including searching the set of audio segments for the plurality of phrases, and the step of producing including producing a set of results of all audio segments including (i) at least one occurrence of a selected required one of the plurality of phrases and (ii) non-occurrences of at least one selected forbidden one of the plurality of phrases to be excluded from within the audio segments, the occurrence and non-occurrence determined with respect to the minimum confidence that a given occurrence within the audio segments is a match for a corresponding one of the plurality of search phrases.

According to another feature of the invention, the step of defining may include defining a plurality of phrases, the step of searching including searching the set of audio segments for the plurality of phrases, and the step of producing including producing a set of results of all occurrences of the plurality of phrases identified in a specified temporal relationship within the audio segments with the minimum confidence that a given occurrence within the audio segments is a match for a corresponding one of the plurality of search phrases.

According to another feature of the invention, the step of defining may include defining a plurality of phrases, the step of searching including searching the set of audio segments for the plurality of phrases, and the step of producing including producing a set of results of all audio segments lacking occurrences of the plurality of phrases identified in a specified temporal relationship within the audio segments with the minimum confidence that a given occurrence within the audio segments is a match for a corresponding one of the plurality of search phrases.

According to another feature of the invention, the temporal relationship may be with respect to the phrases (e.g., <phrase 1> within 5 second of <phrase 2.>) or with respect to the audio segment (e.g., <phrase 1> within 5 seconds of <segment end>).

According to another feature of the invention, the a step of identifying the set of audio segments may be included. Identification may be performed response to CTI data which may include (i) called number (DNIS) and/or (ii) calling number (ANI), and/or (iii) Agent Id (a unique identifier of the agent that handled the call).

According to another aspect of the invention, a system for searching audio data may include control logic operable to define a phrase to use for searching and define a minimum confidence level for searching; and a search engine operable to search a set of audio segment for the phrase and produce a set of results of all occurrences of the phrase within the audio segments and the confidence that a given occurrence is a match for the search phrase. The control logic and/or search engine may be implemented by software stored on and/or executed by a programmable processor such as a general purpose computer or a dedicated platform such as a CTI system.

BRIEF DESCRIPTION OF THE SEVERAL VIEWS OF THE DRAWINGS

FIG. 17 is a screen shot of a workstation display depicting a sample report generated by the system including speech-related statistics;

DETAILED DESCRIPTION OF THE INVENTION

Figure 1:
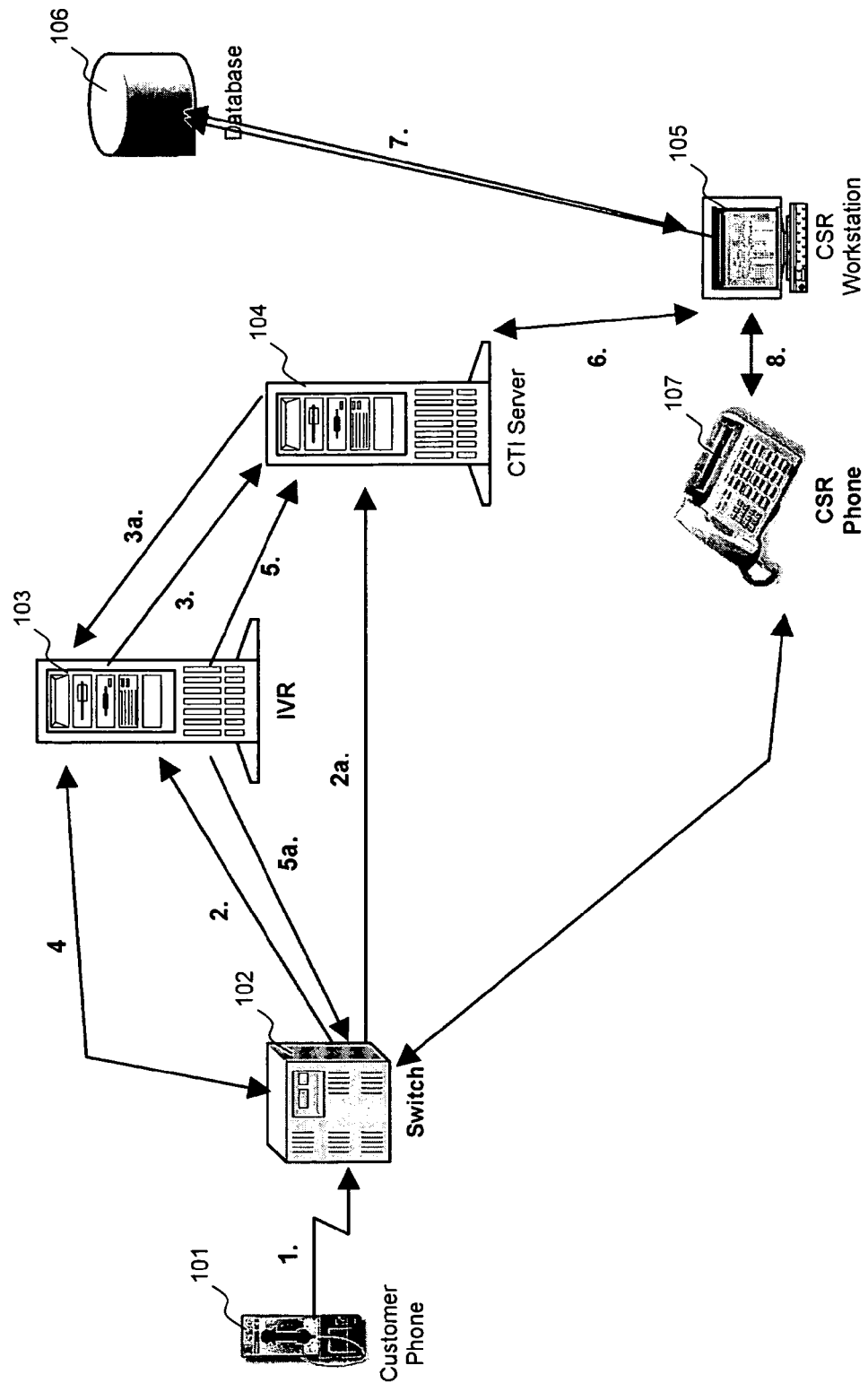
FIG. 1 is a diagram of a Contact Center.

The ensuing description provides exemplary embodiments only, and is not intended to limit the scope, applicability, or configuration of the invention. Rather, the ensuing description of the exemplary embodiments will provide those skilled in the art with an enabling description for implementing an example embodiment of the invention. It should be understood that various changes may be made in the function and arrangement of elements without departing from the spirit and scope of the invention.

To address the shortcomings of prior art systems, it would be advantageous to provide an automated call monitoring system capable of automatically analyzing all telephone calls as they are recorded, which is also capable of reviewing and monitoring previously recorded calls. It would be further advantageous to be able to easily search for spoken words, phrases or word sequences in the recorded audio using speech recognition technology.

In a modem contact center, there is more to voice logging than just recording audio. There are many reasons why a contact center has a voice, or call, logger: liability, training, and quality are some examples. To be useful, logged conversations must be located by some reasonable criteria in a timely manner.

In a typical situation, a contact center manager may receive a call from a caller who may be dissatisfied with service provided by a CSR during a recent call. To investigate the issue, the contact center manager may ask for the caller's name, time and date of the call, and the name of the agent they spoke to. Using prior technology, the task of locating the call recording in any voice logger if formidable. Although it may be approximately known when the caller called (or at least when they think they called, given time zone differences), it may be difficult to identify the CSR handling the call. Thus, the manager must search for the recording, knowing that it will take hours to locate the right one, and that the correct recording may never be found. This search problem is exacerbated in many situations in which there is a free seating environment for the CSRs such that, even knowing who the agent was and which campaign the call came in on, it will be of little help, because there is no way to link the voice data with the caller's record. Thus, it is desirable to reduce the number of records to be searched to a manageable subset. Ideally, the desired record(s) can be located in seconds with a simple, single search command. These goals and objectives are satisfied according to the various embodiments of the invention.

A voice logger according to one embodiment of the invention is more than a simple tape recorder, with sufficient data recordings that can be quickly located and played back. To obtain the necessary data, the voice logger may be integrated into a contact center's infrastructure, preferably to the ACD/PBX switch. For more complex searching, the voice logger may be integrated with the IVR and CSR workstation software.

One arrangement to integrate a call logger is to merge data from the billing output of the switch (SMDR) into the logged call records. Generally, the SMDR (The term SMDR is used generically to encompass all billing outputs) output of a switch contains the time/day of the call, the phone number of the party in the PSTN, the extension of the party on the switch, and the involved trunk ID. An advantage to SMDR integration is its relative ease of implementation and low cost. Many commercially available switches include a SMDR port by default. The SMDR port is usually an RS232 port that outputs billing records at the completion of calls. There may be a number of disadvantages to the use of SMDR. For example, the SMDR port may already be in use by the billing system such that, to share the data, an RS232 splitter device may be employed.

The amount of data available in the SMDR record, though sufficient for billing, may not be sufficient for narrowing searches. For example, CSR ID may not be included as an output field such that, in a free seating environment, it may be difficult to directly identify and locate calls for a particular CSR. Further, recorded call segments that span conferences and transfers may be difficult to accurately be accounted for. Another problem sometimes encountered is caused by systems using some form of proprietary fixed data format. In such cases, it may be difficult to obtain assistance from the switch manufacturers to update its SMDR format to accommodate advanced voice logging features. Note also that the call logger and the switch must agree, to the second, on the current time; clock drift will interfere with the logger's ability to merge data and that data from other sources, such as an agent's desktop or from an IVR may be difficult or impossible to integrate.

Some advanced features of an embodiment of the present invention rely on a Computer Telephony Integration (CTI) approach. CTI is used here as a generic term to describe a computer system that operates as an adjunct to the ACD/PBX. The adjunct system receives a stream of call related event messages for processing. Additionally, CTI can include the use of CTI middleware. Commercially available ACD/PBX switches typically include such CTI capability. An advantage to the use of CTI is that almost any available data can be collected and stored with the recording. In its simplest form DNIS, ANI/CLID, collected digits, and agent ID can be obtained and stored. Additionally, more complicated integrations can be performed. CSR entered data, data from a CRM system, and data from an IVR can be collected and attached to recordings. Contacts that span multiple agents can be retrieved together. PBX/ACD features such as free seating are easily accommodated. As new sources of data become available, they can be integrated into the CTI solution.

A CTI based system according to embodiments of the invention is not dependent on the clock settings of the switch. The CTI system receives the event messages in real-time and records the data in the call logger as the data becomes available. If there is no current CTI solution in a center, many of the other benefits of CTI (such as screen pop and cradle to grave reporting) can be realized at the same time. That is, the installed system becomes a base upon which other advanced contact center features can be built and provide for more efficient operations. To retrieve call related data, a supervisor simply asks the caller for their account number (or for any other data used to uniquely identify callers) and executes a search in the call logging system. The supervisor is quickly given access to the call recording and can evaluate and handle the situation. There typically is no need to call the customer back, nor is there a need to spend countless hours searching for the necessary recording. In addition to CTI data, which is optional, audio segments always have intrinsic data such as the start and end time of the call and the recording channel which captured the call.

Thus, embodiments of the present invention include audio data analysis and data mining using speech recognition technology. Embodiments of the present invention further provide an audio analysis intelligence tool that provides ad-hoc search capabilities using spoken words as an organized data form and an SQL like interface to process and search audio data and combine it with other traditional data forms.

Figure 2:
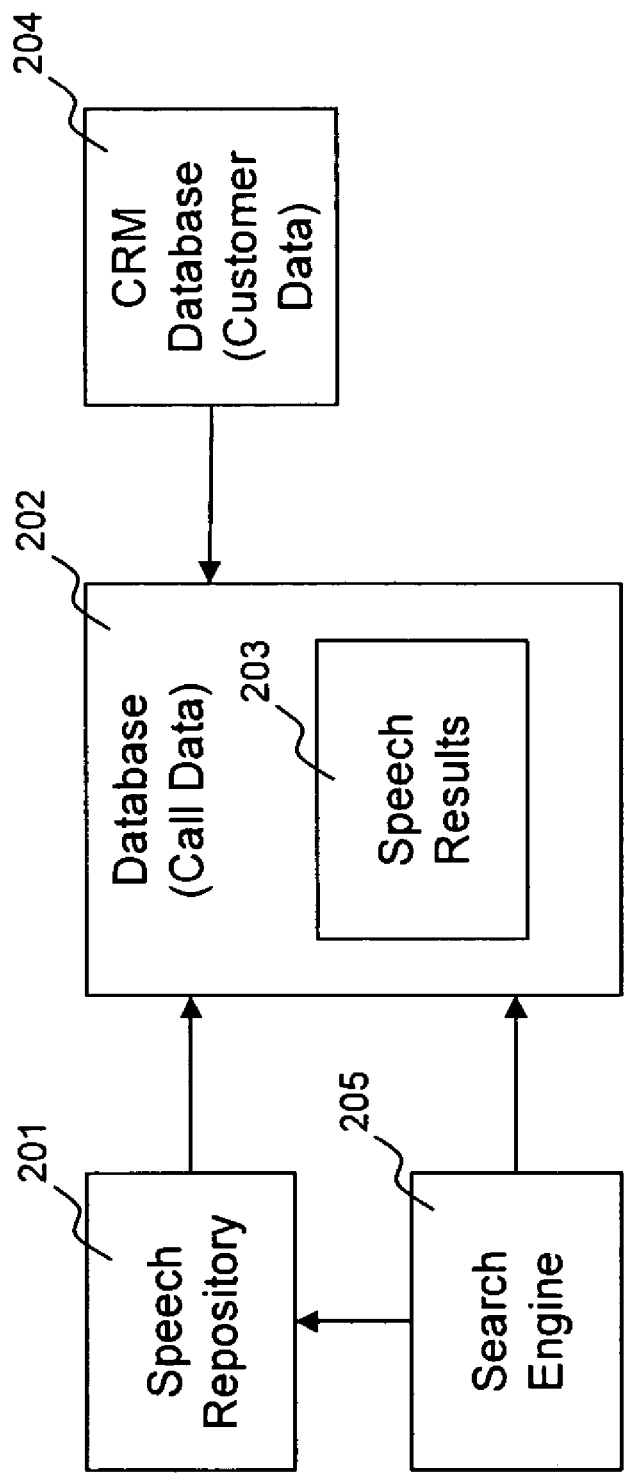
FIG. 2 is a block diagram of system for processing, storing and searching speech.

The present invention integrates a search for spoken words, phrases or sequences of words in an audio segment with a search for traditional SQL data. As shown in FIG. 2, a speech repository 201 is provided which stores recorded audio (e.g., recorded telephone calls). A database 202 is provided which stores information regarding each call that is recorded and stored at repository 201. Call data stored at database 202 may include the start and end time of the call, the ANI (Automatic Number Identification) and DNIS (Dialed Number Identification Service) of the call, agent identification information, CTI (Computer Telephony Interface) information pertaining to the call (which may be accessed by integrating a CTI database 204 with the database 202), and any other information that may be pertinent to the call. The CTI database stores customer information. A search engine 205 is provided for searching both the database 202 and the speech repository 201.

A search criteria is provided to the search engine 205 that includes Speech Criteria and SQL criteria inter-mixed. An example of such an inter-mixed search criteria is as follows. Search all
WHERE StartTime>'10:00:00 10/31/2001' AND
EndTime<'11:00:00 10/31/2001' AND
DNIS='8005551212' AND
AGENTSUFX='Group 1' AND
(Said='TALK TO YOUR MANAGER'
OR Said='TALK TO YOUR BOSS'
OR Said='TALK TO YOUR SUPERVISOR'
AND Said='COMPETITOR NAME' OR Said 'CANCEL SERVICE')

A pre-processor in the search engine 205 creates a "meta-SQL" that modifies the original search criteria so that every instance of speech expressions within the search criteria is replaced with an expression that evaluates to TRUE, such as "True=True", to enable an SQL search of the database 202. In the example search criteria set forth above, the speech criteria portion:

(Said='TALK TO YOUR MANAGER'
OR Said='TALK TO YOUR BOSS'
OR Said='TALK TO YOUR SUPERVISOR'
AND Said='COMPETITOR NAME' OR Said 'CANCEL SERVICE')
may be replaced with the following expression:
TRUE=TRUE
OR TRUE=TRUE
OR TRUE=TRUE
AND TRUE=TRUE,
so that the meta-SQL is as follows:
Search all
WHERE StartTime>'10:00:00 10/31/2001' AND
EndTime<'11:00:00 10/31/2001' AND
DNIS='8005551212' AND
AGENTSUFX='Group 1' AND
TRUE=TRUE
OR TRUE=TRUE
OR TRUE=TRUE
AND TRUE=TRUE, The search engine 205 executes the meta-SQL against the database 202. This yields a "search set". In this example, the search set will include all calls which start at 10:00 on Oct. 31, 2001 and end on 11:00 on Oct. 31, 2001 where the dialed number was 800-555-1212 and handled by agents in Group 1. The search set identifies a set of voice communications (e.g., telephone calls) within the speech repository 201. For each voice communication in the set identified by the meta-SQL search, a speech search is executed by the search engine 205 for each of the search expressions that were given in the original search criteria. Using the example search criteria provided above, each voice communication in the set identified by the meta-SQL search of database 202 is located in the speech repository 201 and searched for the speech expressions:
(Said='TALK TO YOUR MANAGER'
OR Said='TALK TO YOUR BOSS'
OR Said='TALK TO YOUR SUPERVISOR'
And Said='COMPETITOR NAME' OR Said 'CANCEL SERVICE').

Each result of the speech search is written into the database 202, thus bringing the speech domain to the database domain. The results of the speech search may be stored in a separate portion 203 of the database 202.

The speech expressions in the search criteria are then replaced with references to the database table 203 where the speech results were written from the speech search. The new, replaced search criteria is executed against the database, providing a "final result" set.

Embodiments of the present invention allow customer interaction center managers and executives to fully understand the dynamics of agent and customer communication through analysis of spoken word, without the need to invest in the tedious, time consuming, laborious, boring and very expensive process of having to expend cycles listening to live or recorded audio. Mining of audio content and combining audio data with other traditional forms of data penetrates a frontier that has been high on the wish list of Contact Center managers until now. Embodiments of the present invention provide for historical analysis without the need to reprocess speech and may be combined with speech recognition monitoring of audio data as described in the commonly assigned and concurrently filed provisional application entitled "Methods and Apparatus for Audio Data Monitoring Using Speech Recognition" to enable the desirable paradigm of "process once, search many" with a search capability that approaches 70,000 times faster than real time.

Figure 3:
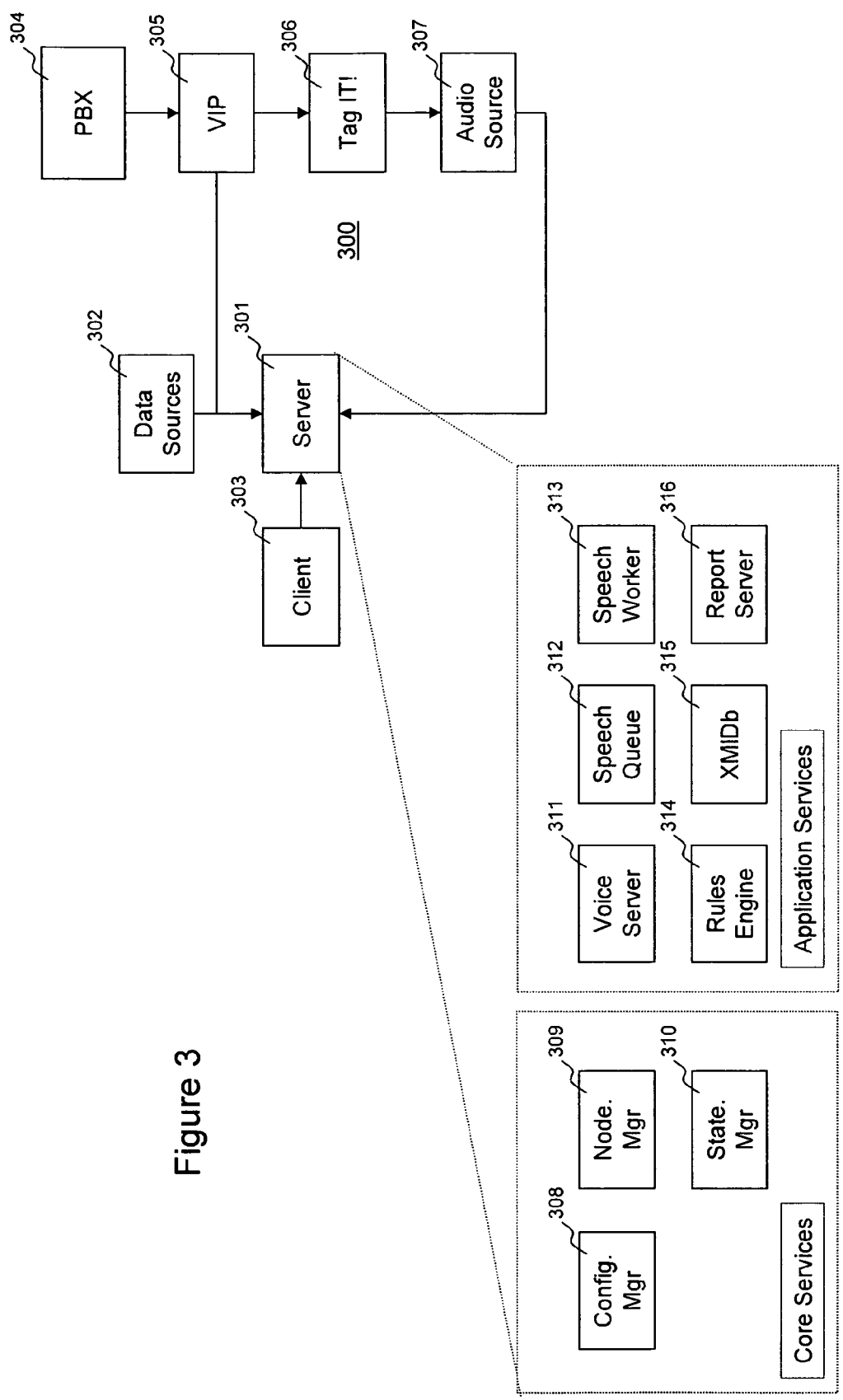
FIG. 3 is a block diagram of a computer integrated telephony (CTI) system incorporating audio processing according to an embodiment of the invention.

Embodiments of the present invention may be incorporated into and invoked as part of a CTI system. An embodiment of the present invention for the retrieval of audio data is exemplified by a product designated of VorTecs, Inc. known as "Mine It!" Mine It! may be used in connection with VorTecs, Inc.'s Spot It! Product, that latter incorporating features of embodiments of the invention which is the subject of the above-referenced concurrently filed provisional application. (SER Solutions, Inc. is the successor in interest to VorTecs, Inc., and provides improved systems, Sertify providing a feature rich embodiment of Spot It! functions, and Sertify-Mining providing enhanced features to the MineIt! product.) As described therein, Spot It! and Sertify are rules based call monitoring applications designed to be compatible with customer interaction infrastructures that listens to calls and automatically executes actionable events based on the result. Sertify augments existing recording systems to provide a greater level of automation, enhanced operational flexibility, and a comprehensive electronic analysis of customer contacts including spoken word. A system configuration is shown in FIG. 3 including a Server 301 connected to and receiving data from Data Sources 302, Voice Information Processor (VIP) 305, and Audio Source 307. PBX 304 is connected to VIP 305 which, in turn, is connected to TagIT! 306 which, supplies its output to Audio Source 307. Server 301 includes both Core and Application Services, The Core Services include Configuration Manager 308, Node Manager 309 and State Manager 310. The Application Services include Voice Server 311, Speech Queue 312, Speech Worker 313, Rules Engine 314, Xml Database 315, and Report Server 316.

Figure 4:
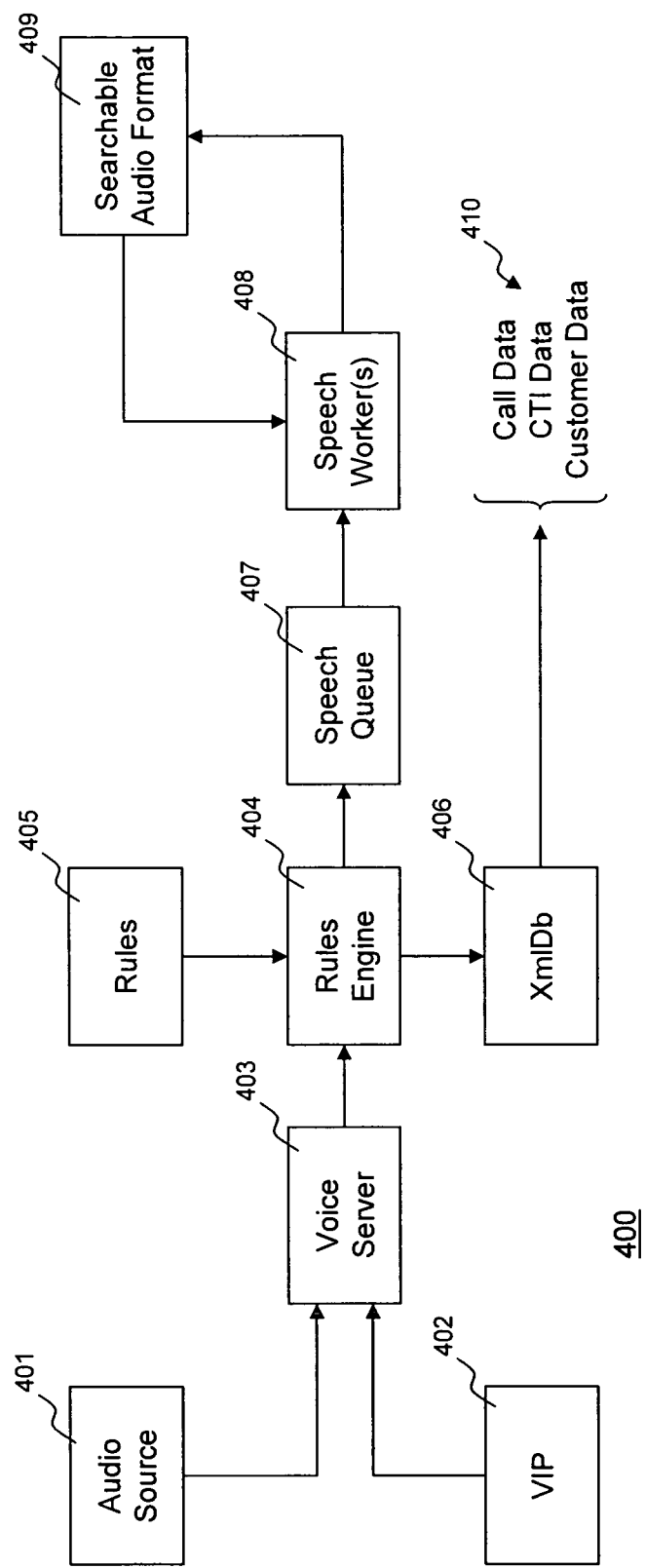
FIG. 4 is a dataflow diagram of the embodiment depicted in FIG. 3.

A dataflow for processing audio data is depicted in FIG. 4. As shown therein, audio from Audio Source 401 and VIP 402 are supplied to Voice Server 403. The combined audio files from Voice Server 403 are made available to Rules Engine 404 which applies one or more Rules 405 to selectively provide appropriate audio segments to Xml Database 406 and Speech Queue 407. Xml Database 406 associates the audio segments with Call Data, CTI Data and Customer 410. Speech Queue 407 makes the audio segments available to Speech Worker(s) 408 which processes the audio segments to provide Searchable Audio Format 409. The searchable format may convert the audio into a series of symbols, such as phonemes, that represent the speech and can be searched and otherwise handled as discrete data. Examples of word spotting and phonetic searching are described in U.S. Pat. No. 6,408,270 entitled Phonetic Sorting And Searching issued Jun. 18, 2002 to Garber; U.S. Pat. No. 6,061,652. entitled Speech Recognition Apparatus issued May 9, 2000 to Tsuboka, et al.; U.S. Pat. No. 5,884,259 entitled Method And Apparatus For A Time-Synchronous Tree-Based Search Strategy issued Mar. 16, 1999 to Bahl, et al.; U.S. Patent Publication No. 20020147592 entitled Method And System For Searching Recorded Speech And Retrieving Relevant Segments of Wilmot et al. published Oct. 10, 2002; and No. 20010049601 entitled Phonetic Data Processing System And Method of Kroeker et al. published Dec. 6, 2001.

Figure 5:
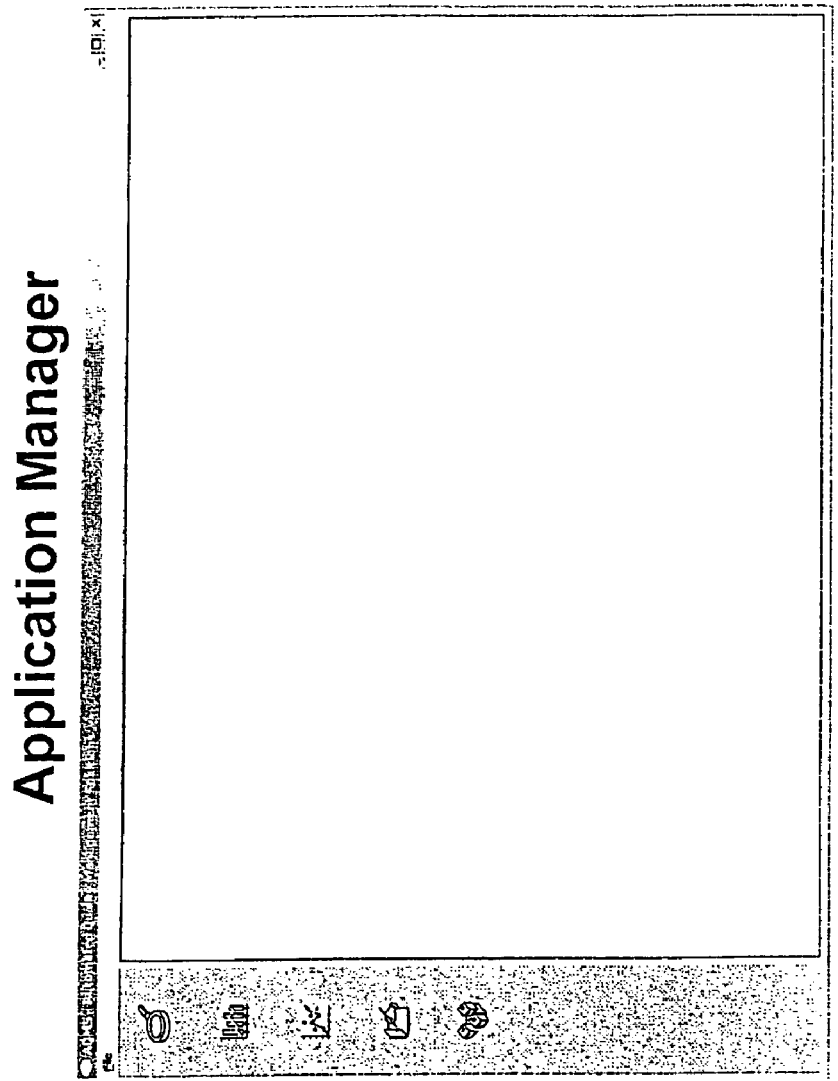
FIG. 5 is a screen shot of a workstation display depicting an application manager used to access CTI system components including systems and functionalities according to embodiments of the invention.
Figure 6:
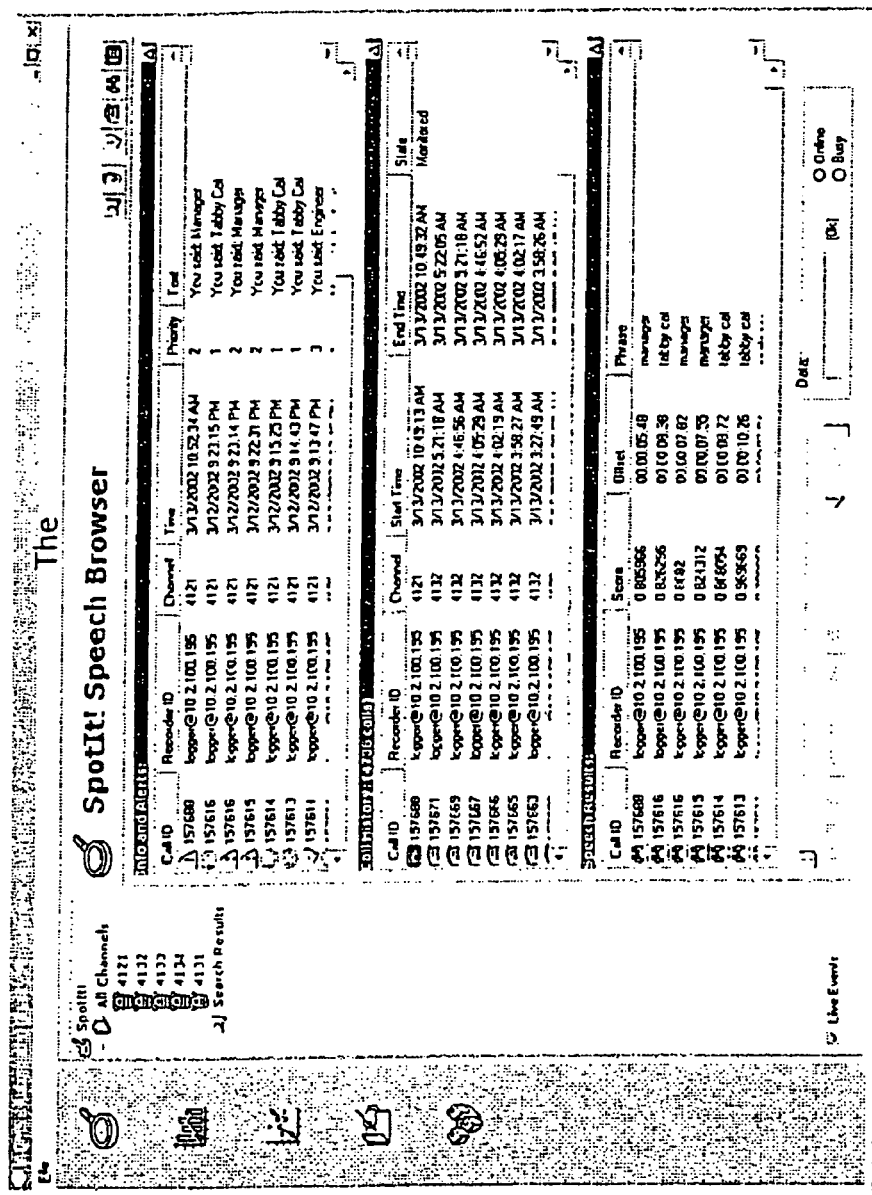
FIG. 6 is a screen shot of a workstation display depicting a speech browser main display used to browse and filter calls, playback audio, search for and retrieve audio associated with calls, and implement speech-processing of audio.

FIGS. 5-17 depict screen shots of a speech mining interface according to an embodiment of the present invention. Referring to FIG. 5, an initial screen of an application manager provides a single, integrated interface for accessing all components of a suite of programs including those providing for the capture of audio and data and mining of the captured data. FIG. 6 depicts a speech browser providing an interface for (i) browsing calls, (ii) filtering calls, (iii) audio playback and queuing to exact moments when phrases are detected, (iv) speech mining, and (v) speech-processor (batch processing). By selecting an item from any one viewport, all other may be configured to automatically filter their results to match the selection. For instance, if the user selects the station "4121" from the tree, Alerts, Call History, and Speech Results viewports will be constrained only to calls that were recorded for the selected station "4121". Furthermore, if the user then selects a specific call from the CallHistory viewport, then the Speech Results viewport may be configured to be constrained only to speech-results associated with the currently selected call. Toolbar buttons in the Speech Browser provide access to the Speech Mining and Speech-Processor functions (shown by themselves). All of the windows may be resizable to provide a familiar interface format.

Figure 7:
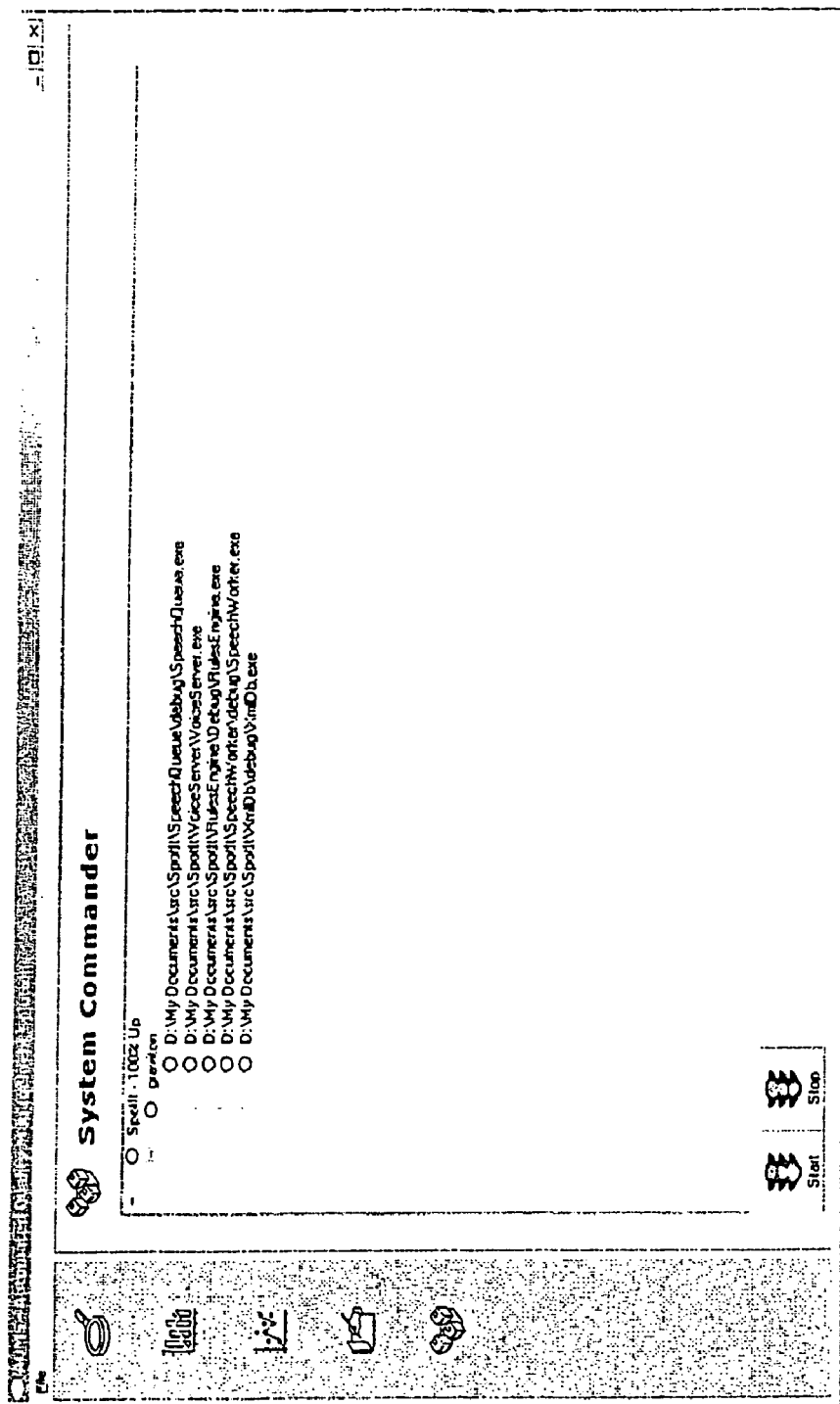
FIG. 7 is a screen shot of a workstation display depicting a system control or commander feature used to start and stop system operations and to provide system status information.
Figure 8:
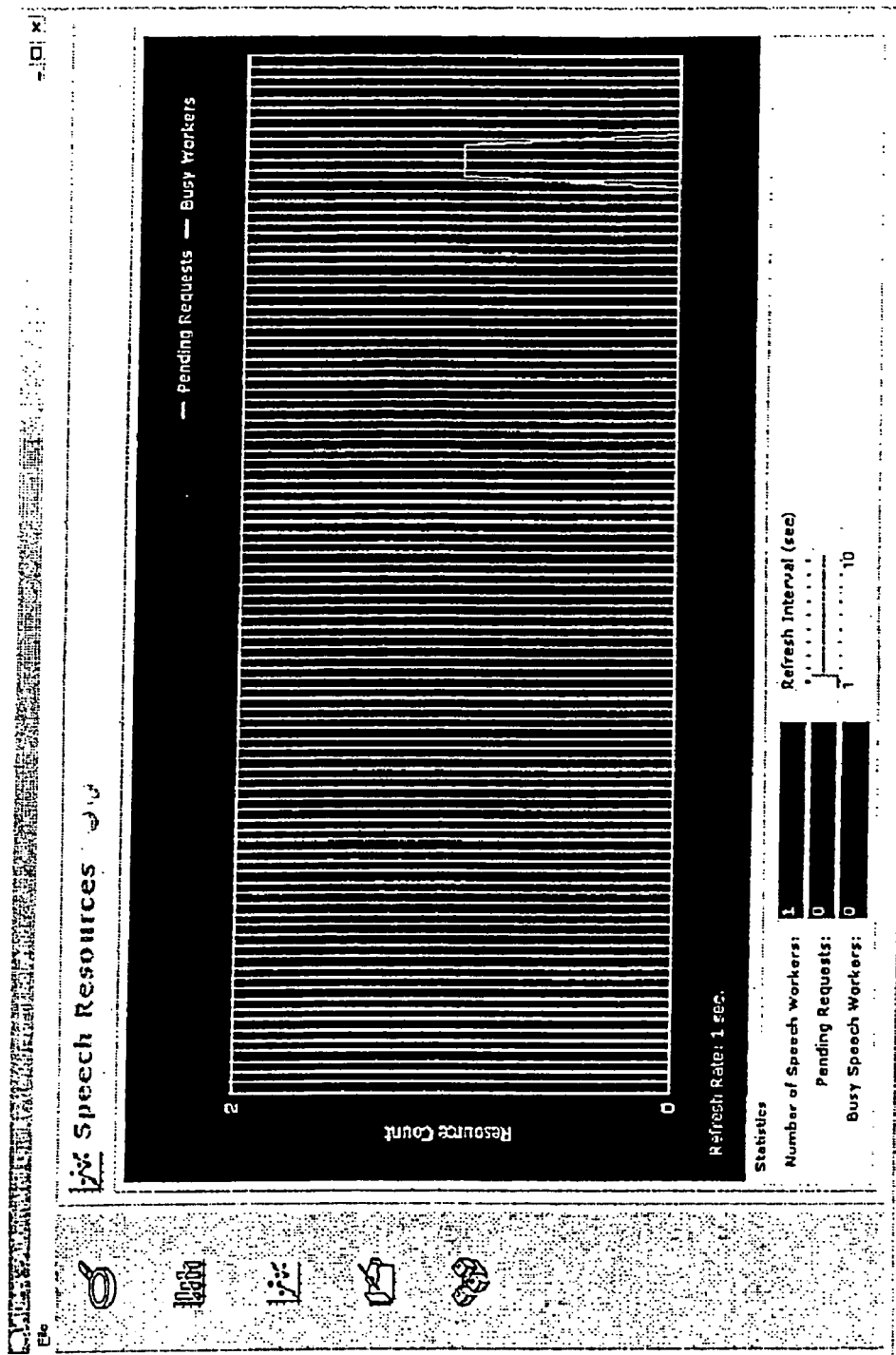
FIG. 8 is a screen shot of a workstation display depicting a speech resources feature used to display system utilization information.

FIG. 7 depicts a system control or system commander screen used to start and stop the systems, as well as provide system status information. Since the system may accommodate multiple servers, the system commander provides a single interface for starting, stopping, and viewing status across all servers. A speech resources component depicts in FIG. 8 displays current system utilization. It may be used to observe the rate of requests and how fast the system is keeping up with the requests, together with other system information.

Figure 9:
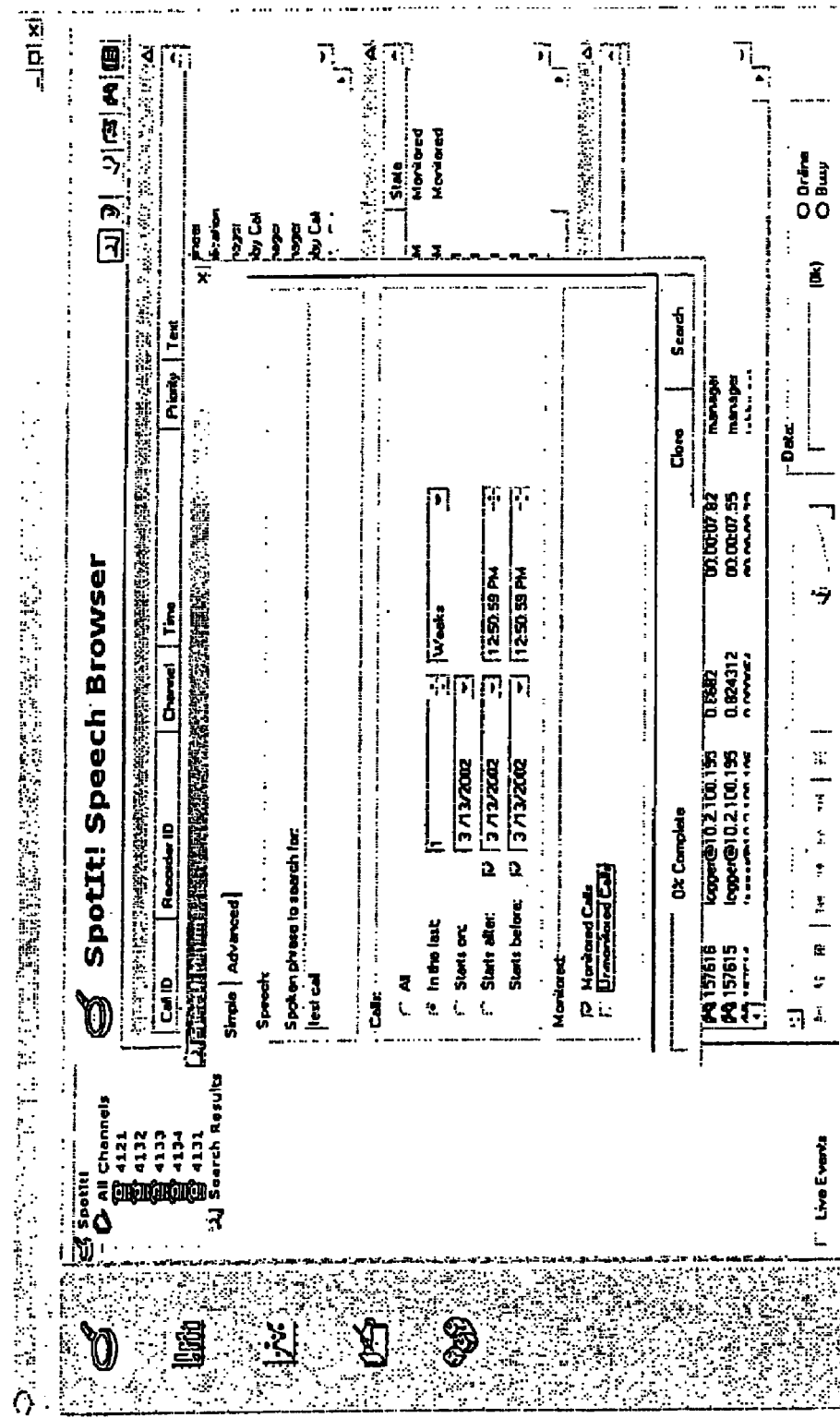
FIG. 9 is a screen shot of a workstation display depicting a speech mining browser used to implement simplified searching of audio segments.
Figure 10:
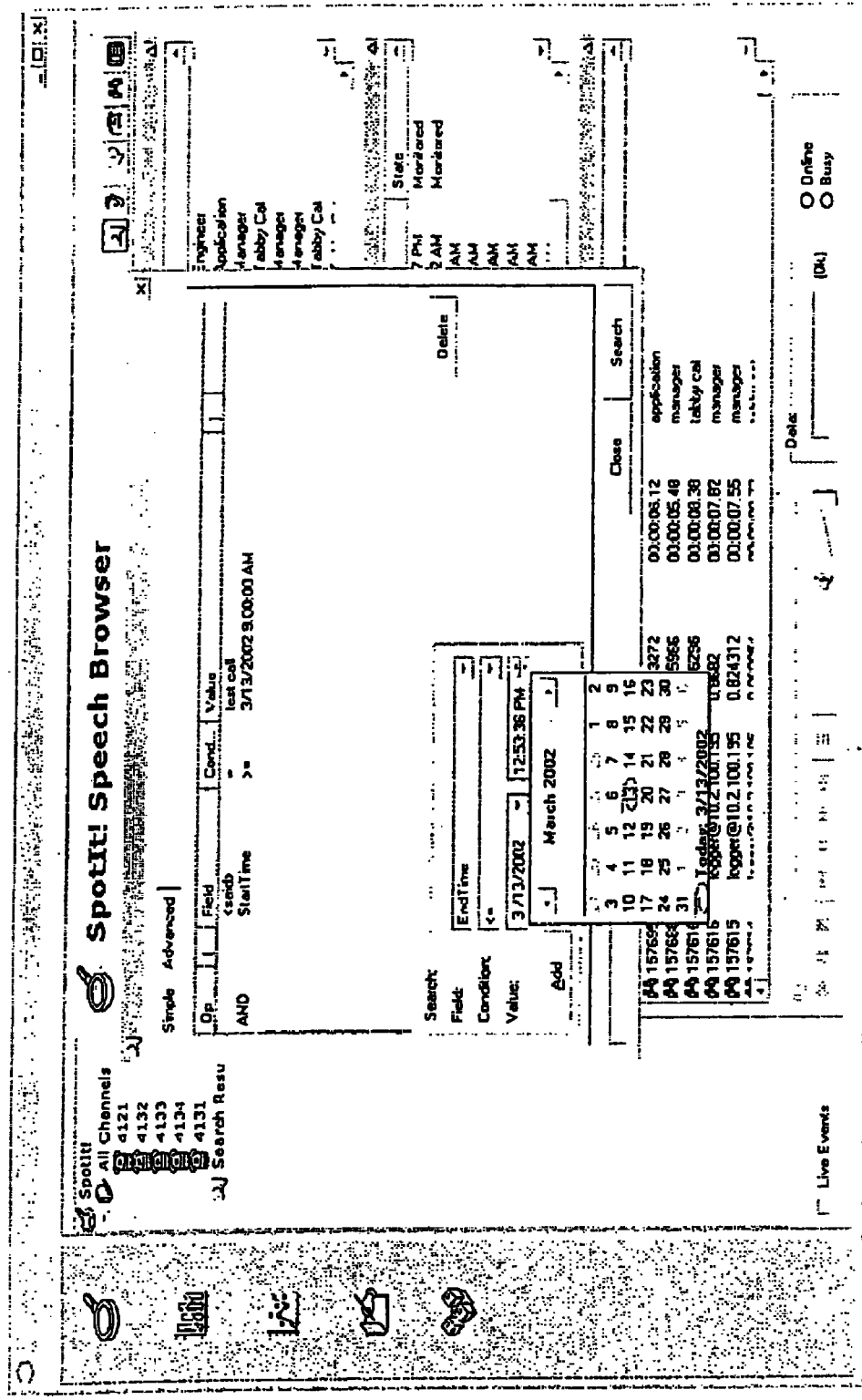
FIG. 10 is a screen shot of a workstation display depicting a speech mining browser used to implement advanced searching of audio segments.

The speech mining interface depicted in FIG. 9 can be invoked from the Speech Browser toolbar. The speech mining interface includes a Simple (FIG. 9) and Advanced (FIG. 10) dialog for selecting the records of phrases that are to be located. A speech-query and data-base-query can be performed together and the unified result presented to a user in the main Alerts, Call History, and Speech viewports. The audio can then be navigated in the same way that regular historical data can be navigated. FIG. 10 depicts the advance tab of the speech mining interface allowing users to build more complex queries against their data. The advanced tab allow users to create SQL and speech-queries that are integrated into a single query.

Figure 11:
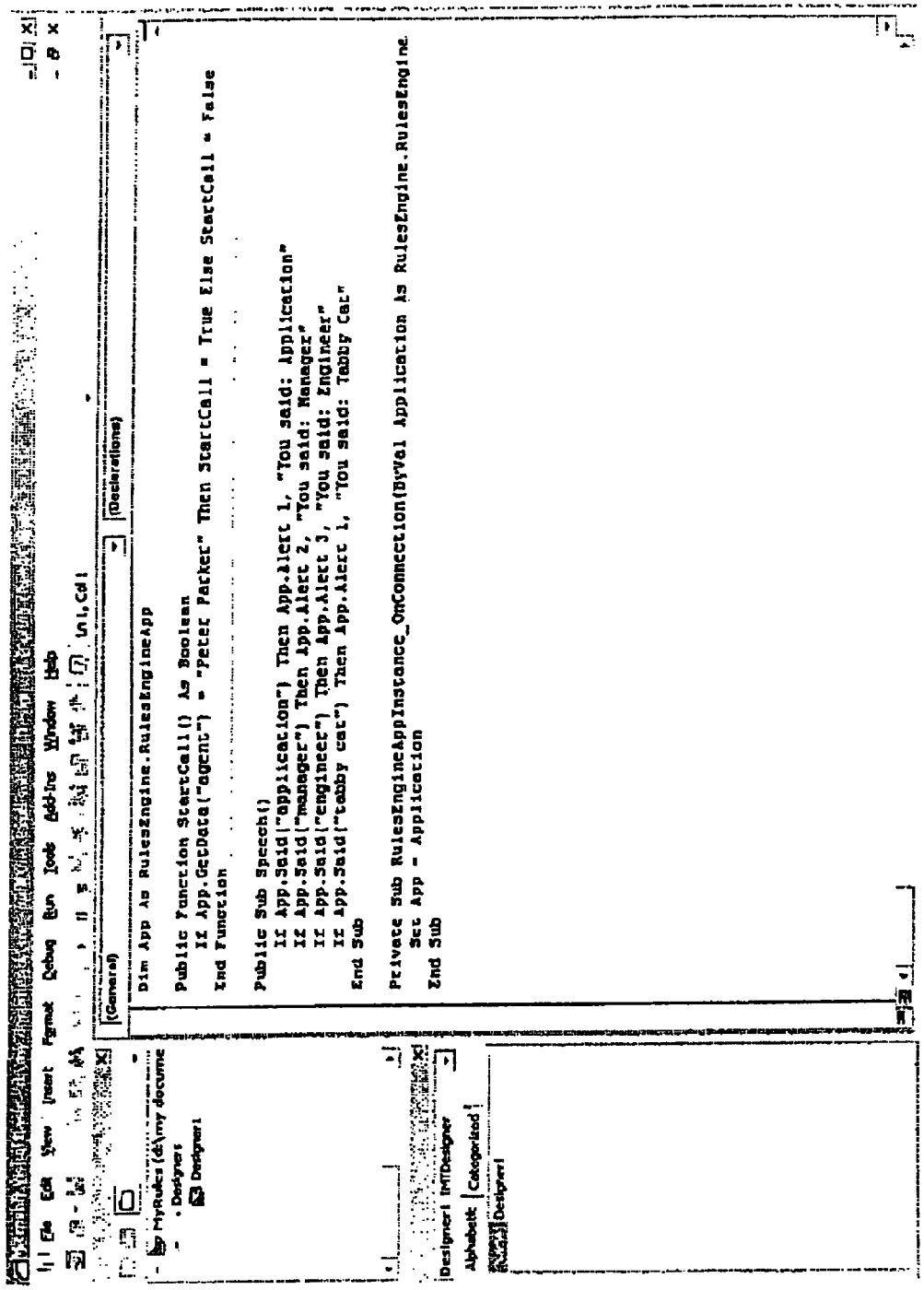
FIG. 11 is a screen shot of a workstation display depicting a rules implemented by a rules engine defining action to be taken upon receipt of a call.

Definition of rules is supported by the interface depicts in FIG. 11. The rules that the rules engine maintains determine what actions are to be taken when a call is presented to the system. In the example depicted in FIG. 11, two important functions have been implemented: StartCall( ) and Speech( ). The StartCall( ) rule determines if a call should be monitored by the system. The Speech( ) rules determined what actions to take when a piece of audio has been processed by the system and is ready to be searched. In this case, the rule displays a warning each time the user mentions the phrase "application", "manager", "engineer", or "tabby cat".

Figure 12:
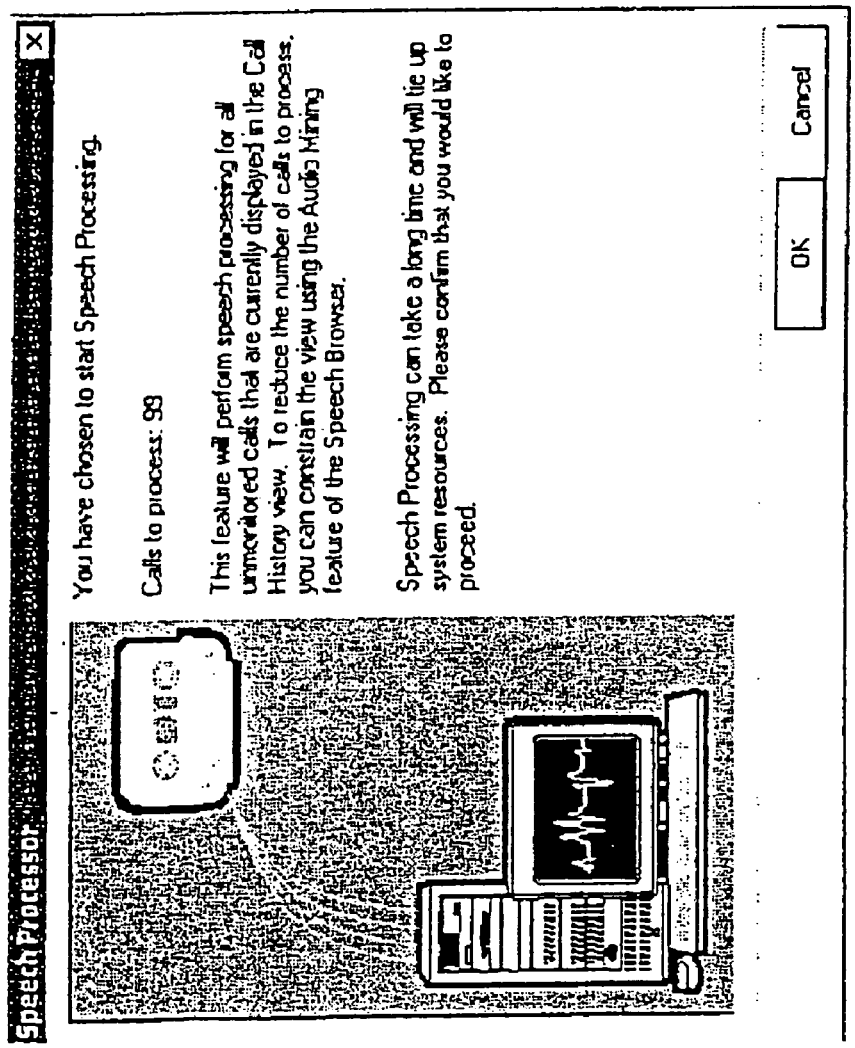
FIG. 12 is a screen shot of a workstation display depicting speech processor functions used for the batch processing of audio files.
Figure 13:
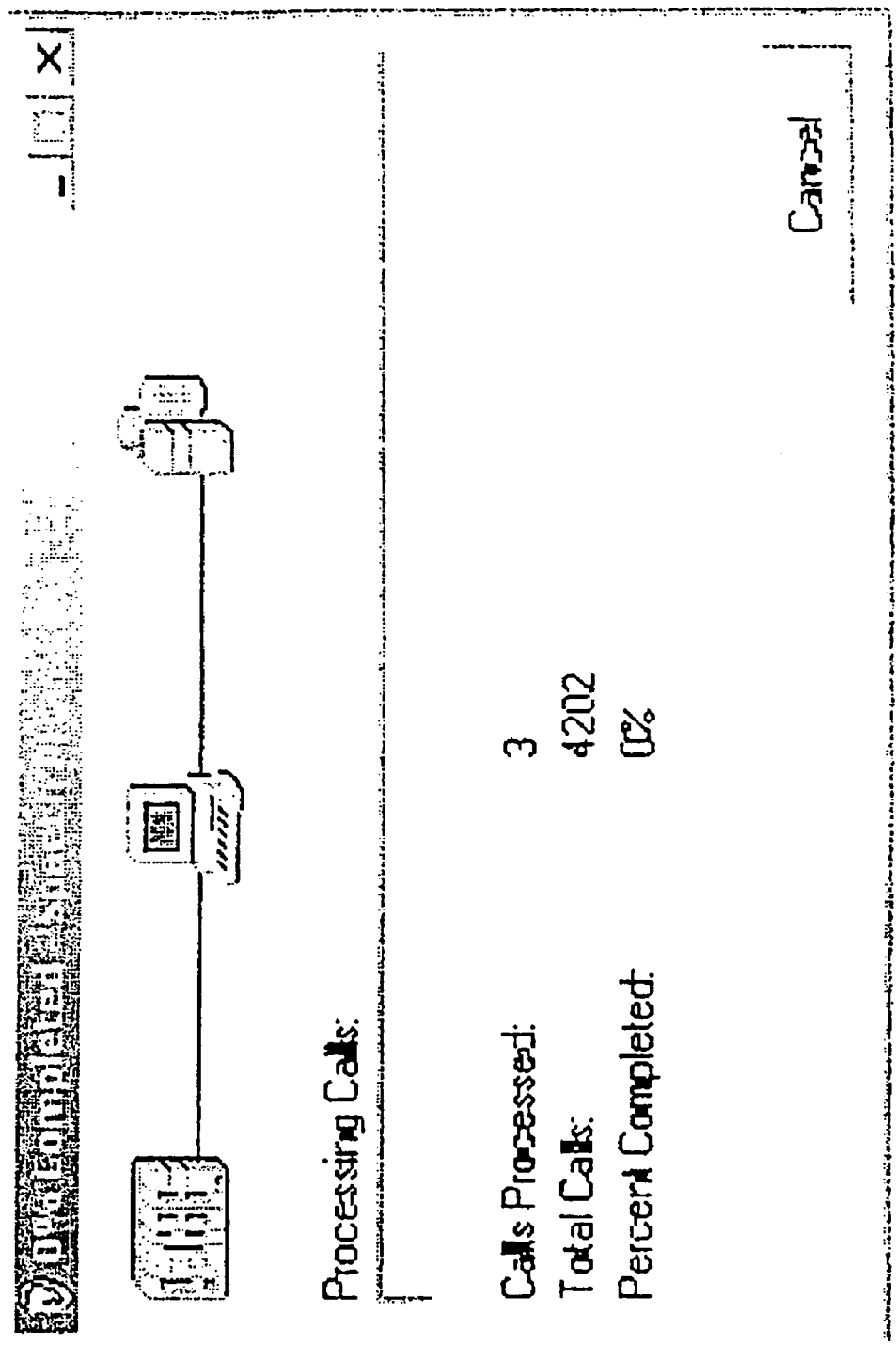
FIG. 13 is a screen shot of a workstation display depicting a progress indicator showing batch processing of audio files.

A dialog displayed upon start of the speech processor is depicted in FIG. 12. The speech processor is a feature of the speech browser that is used for monitoring calls that have not yet been processed by the system. Normally, calls are automatically processed by the system as they take place. This feature allows users to process call that were purposely not processed automatically or to process old call that existed prior to system availability. The speech processor will process the set of calls that are currently being displayed in the speech browser. A typical use of the system is to first use the speech mining feature to constrain the calls to the one that have been selected for processing, and the invoke the speech processor for the calls that have been selected. Speech processor progress may be displayed by an appropriate progress indicator as depicted in FIG. 13, showing calls as processed by the system. Once processed, the calls can be searched at high-speed. Processing may include conversion of the audio into a series of symbols representing the speech, e.g., phonetic information.

Figure 14:
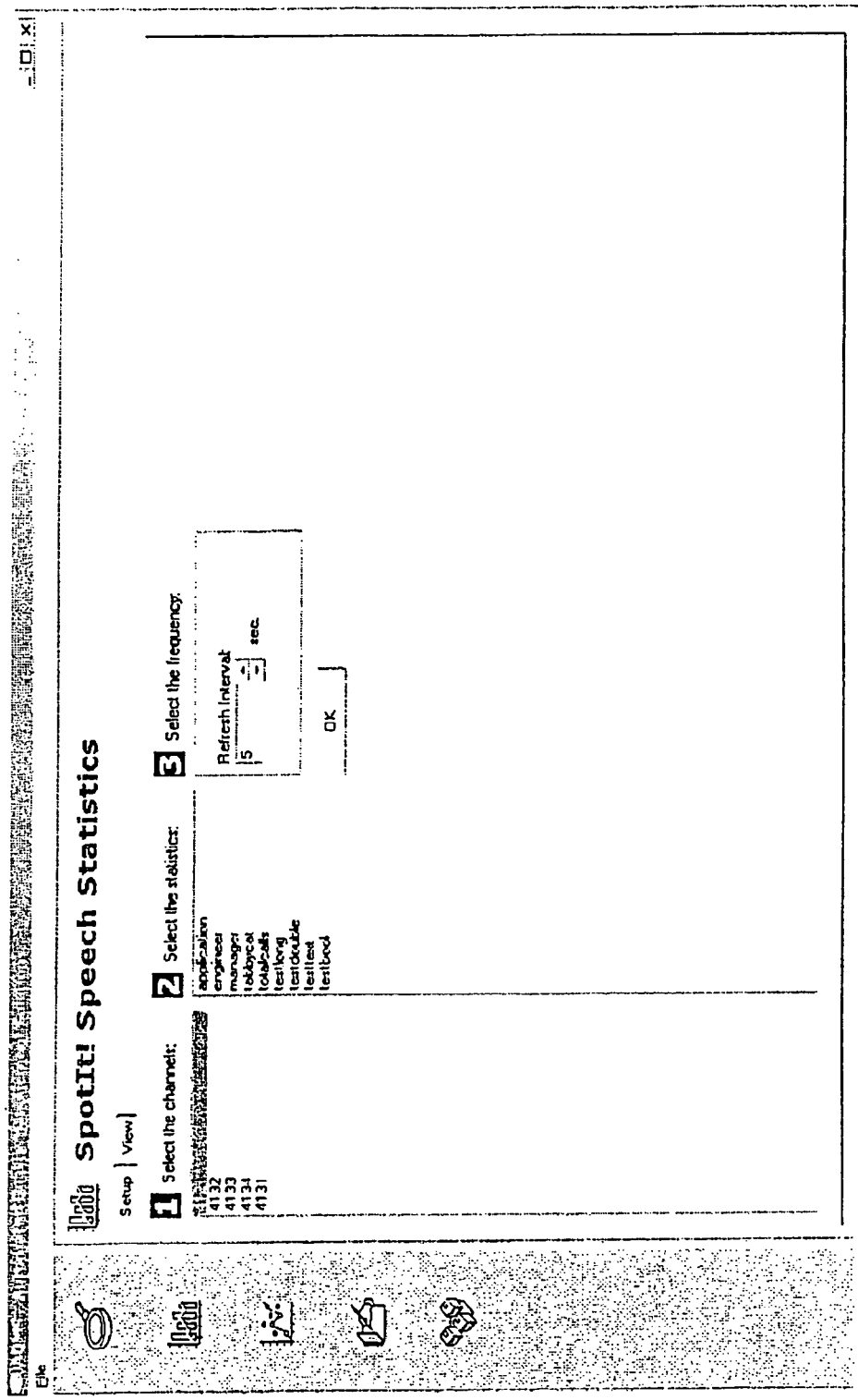
FIG. 14 is a screen shot of a workstation display depicting a speech statistics setup feature used to configure real-time graphic display of system statistics including statistics indicating the occurrence and/or non-occurrence of particular target phrases in associated audio segments and/or associated with selected categories of calls.
Figure 15:
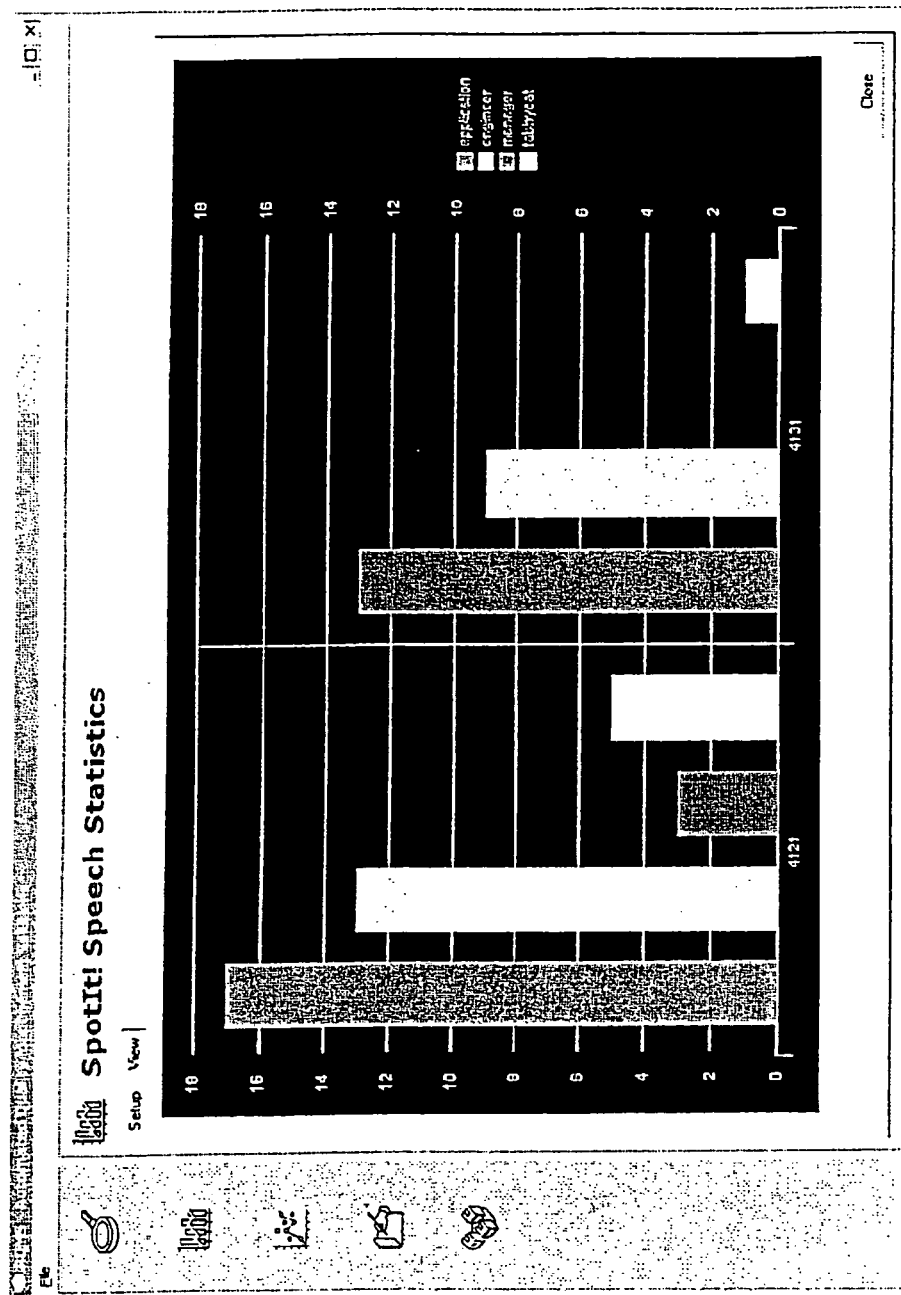
FIG. 15 is a screen shot of a workstation display depicting a sample graph of system statistics including the counts of specified target phrases identified at or associated with particular agent workstations.

FIG. 14 depicts a speech statistics setup display. The speech statistics component is used for displaying real-time graphics of statistics that are maintained by the business-rules of the system. For instance, a statistic can be created to count the number of times that a specific phrase is heard, is missing, or to calculate statistics based on any other measures. Once the speech statistics are setup, a graph such as depicts in FIG. 15 may displayed and updated in real-time. A user can watch as the graph dynamically changes over time to observe trends, not only with speech-related statistics, but with statistics than can be calculated by speech, CTI, system, and user-data.

Figure 16:
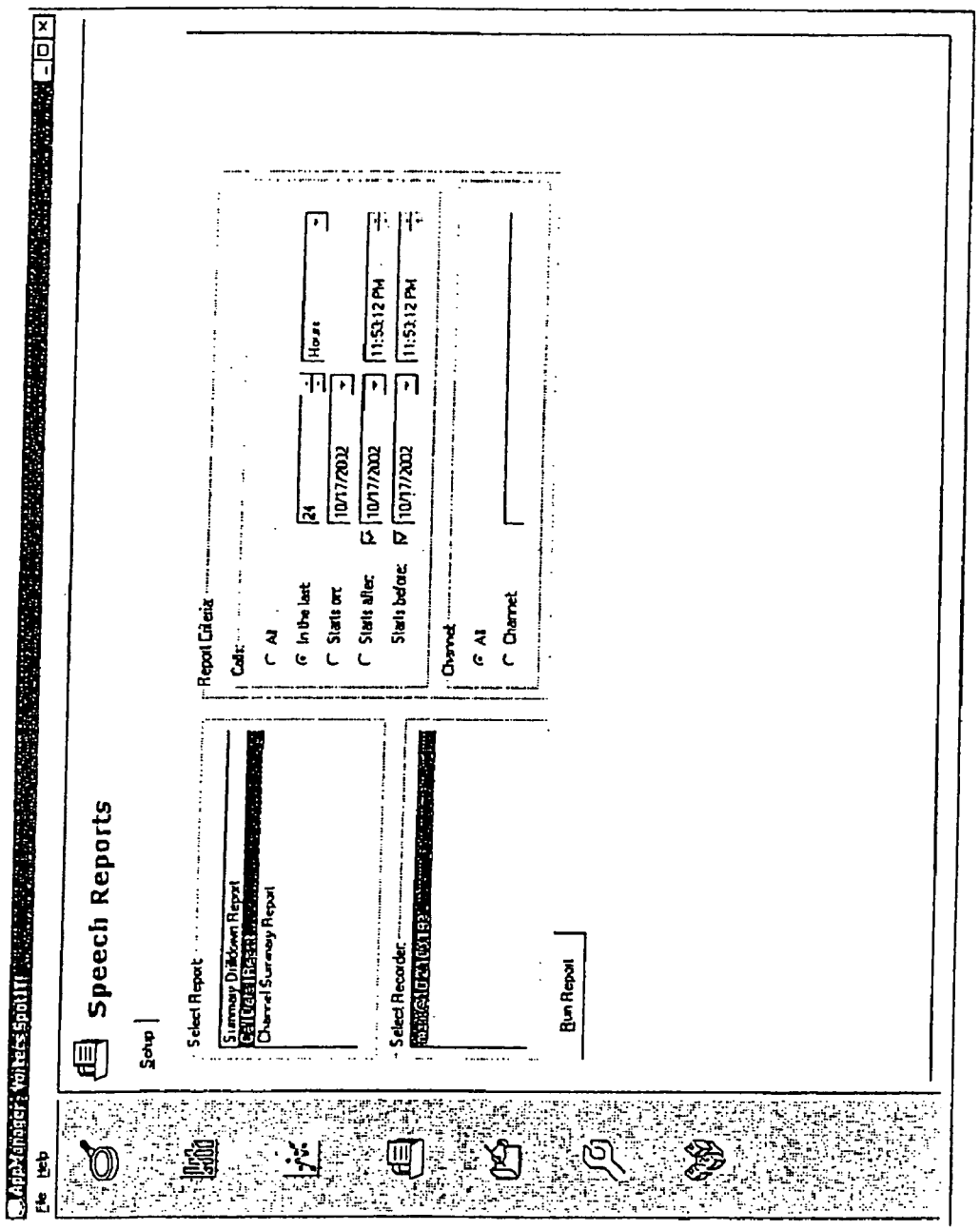
FIG. 16 is a screen shot of a workstation display depicting a speech reporting feature used to create selected reports.
Figure 17:
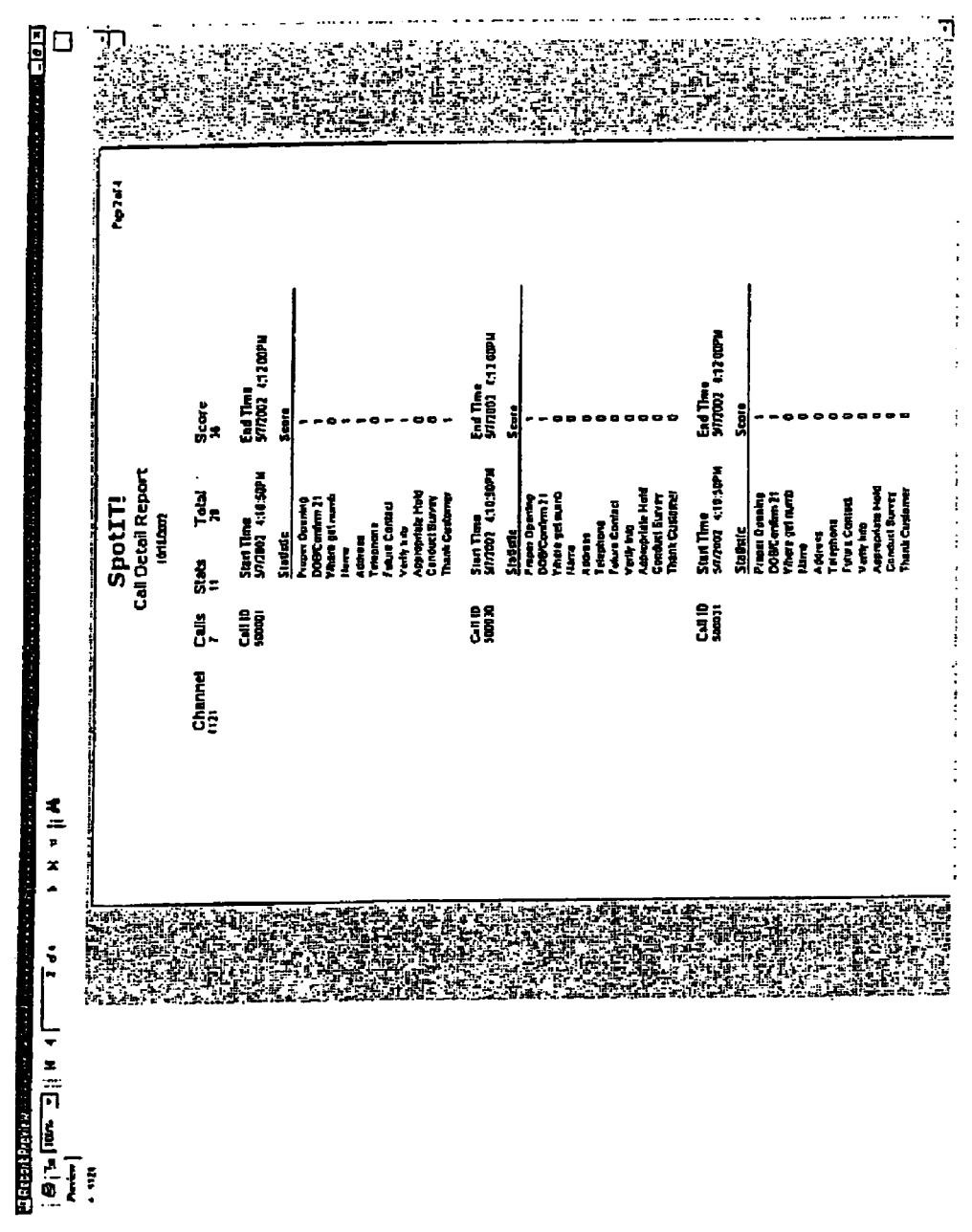

Reports may be defined using, for example, the speech reports setup screen depicted in FIG. 16. The speech reports component is used to report on statistics that are maintained by the business-rules of the system. For instance, a statistics can be created to count the number of time that specific phrase is heard, found to be missing, or to calculate statistics based on any other measure. An example of a resulting report is shown in FIG. 17. Once the speech reports are setup, such a report will be displayed. A user can examine the report to observe performance trends, not only with speech-related statistics, but with statistics that can be calculated by speech, CTI, systems and user-data.

As described above, a speech mining interface according to an embodiment of the invention is invoked from a speech browser tool bar within an application such as Sertify The interface offers a simple and advanced dialog box for implementing search criteria. The tool allows for analysis of words, phrases and the ability to combine audio searches with other available data collections (such as CTI data or call-related data). In other words the interface accesses a database query tool that includes speech as data, as well as traditional data forms. The unified content is presented as an inventory of audio files that are indexed and point to the exact location in the dialogue where the target utterance resides.

Embodiment of the present invention provide the following features and functions:

Treats voice as data;
Reduces overhead costs and capital expenditures;
Identifies trends by including spoken word searches;
Offers a holistic view of contact center and agent activity from the supervisor Console;
Intuitive use with little training required;
Provides simple and advanced user interfaces;
Enables SQL like functionality;
Provides database integration capability;
Enables audio content mining;
Provides statistical and graphical reporting;
Includes multiple search modes; and
Provides voice logger integration.

Embodiments of the present invention may be implemented using the following standards and technology:

Microsoft™ VBA
Microsoft™ SQL Server
CTI
XML
Client-Server Architecture
Voice Over Internet Protocol (VOIP)

Figure 18:
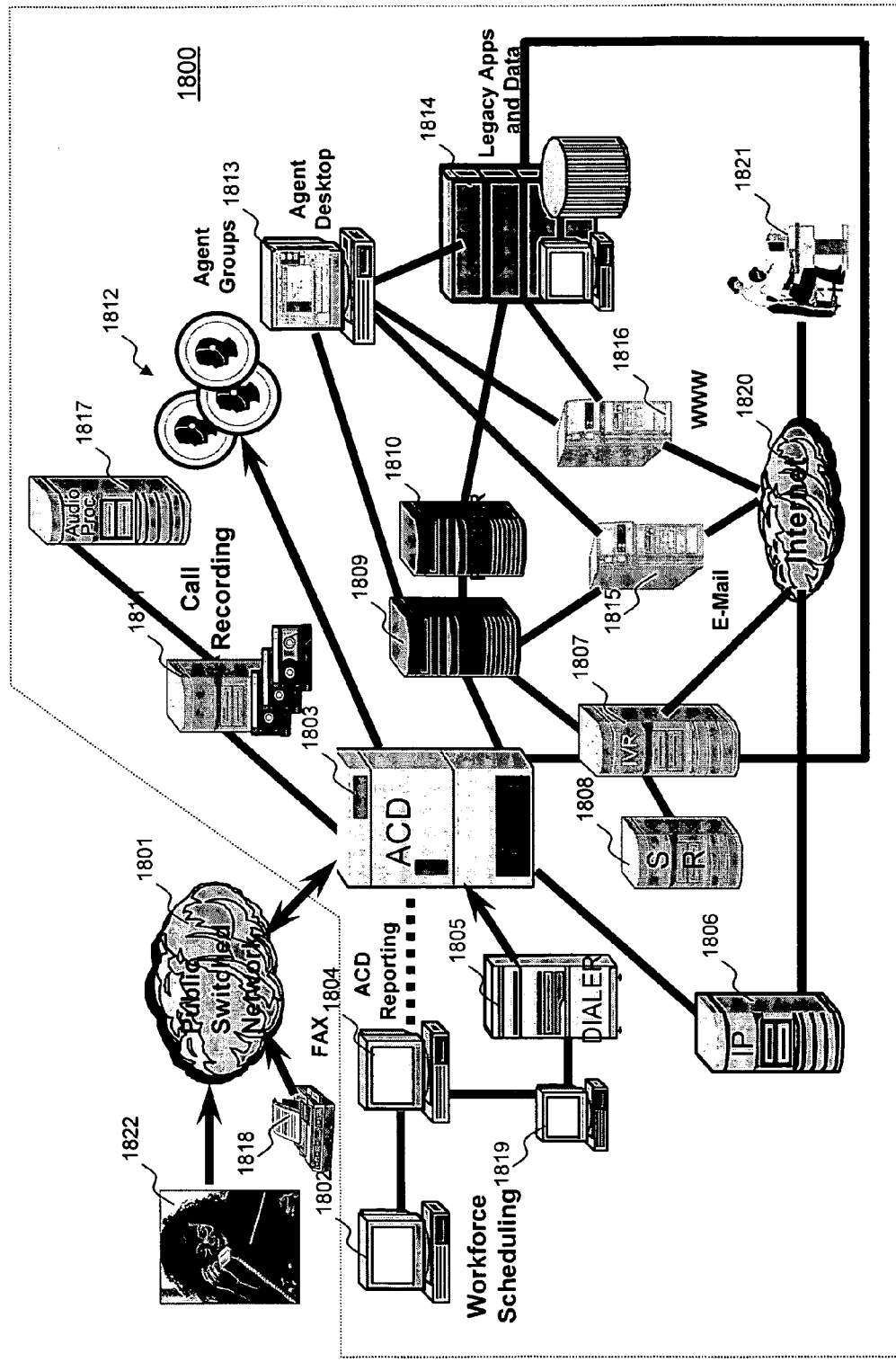
FIG. 18 is a block diagram of a contact center according to an embodiment of the invention.

Although embodiments of the present invention are applicable to a broad range of environments and applications, the examples provided above within the CTI environment are particularly well suited applications of the features and functionalities provided. Such a CTI system is shown in FIG. 18. A contact center 1800 includes:

Audio data monitoring (this component may be incorporated into various ones of the platforms depicted as appropriate)—A system that uses speech processing and automated rules to analyze calls for quality monitoring purposes and order validation.

Public Switched Network 1801—This is the public switched telephone network that provides a high quality voice connection between a customer and a call center.

Workforce scheduling 1802—This is a system that uses historical call data to create a staffing forecast in order to meet a specified service level for how long it will take before a call is answered.

ACD 1803—Automatic Call Distributor is a voice switching platform that connects to PSTN 1801 and to local extensions. Call center agents log in to ACD 1803 which associates a set of skills with each agent. When calls come in for a given skill, normally determined by the dialed number, ACD 1803 will distribute the calls to the set of agents that have the appropriate skill, normally in a round robin fashion.

ACD reporting 1804—An add on package to the ACD 1803 providing reports about ACD 1803 activity. Skill reports normally contain items such as calls handled, calls abandoned, and wait times. Agent reports contain agent specific information such as time on the system, calls handled, avg talk time, longest talk time, etc.

Dialer 1805—A system for predictive dialing. In predictive dialing calls are launched on behalf of a group of agents. Because not all calls may result in a live connect, the number of calls dialed is normally higher than the number of available agents. This system enhances productivity because the system only connects live answers and agents do not have to dial calls or listen to call progress such as ringing or busy signals.

IP 1806—This is an IP gateway so that VOIP calls can be handled by ACD 1803 in the same fashion as calls that arrive over PSTN 1801

IVR 1807—Interactive Voice Response (aka VRU or voice response unit)—a system that allows automated call handling. The system can accept touch tone input, access data, and using text to speech, speak the data to the caller. A common example is a bank application where you can call and get your balance.

SR 1808—Speech Recognition is an add on to IVR 1807 that allows IVR 1807 to accept voice input in addition to touch tone input.

CTI 1809—A computer telephony interface middleware server that interfaces to the proprietary CTI interface of ACD 1803 and allows CTI clients to receive events and exert control over contacts.

Router 1810—An add on application to the CTI middleware for intelligent call routing. When a call arrives, CTI data from the call is used to access information and route the call appropriately, for example putting a high value customer at the head of the queue.

Call Recording 1811—A system that makes digital recordings of calls within the contact center.

Agent Groups 1812—The human employees of the contact center that handle voice calls.

Agent Desktop 1813—A computer interface that runs programs which support the agent interactions with callers.

Legacy Apps and Data 1814—Computer systems that contain data about the callers and the business. Used for routing decisions and to provide information to the callers.

Email 1815—A server for processing email messages. Properly skilled agents can handle email interactions as well as voice interactions.

WWW 1816—A web server that can host self service applications. Self service web applications can be used to off load work from contact center agents by providing information.

Audio Processor 1817—An audio server according to an embodiment of the invention, providing for the processing of audio from Call Recording 1811, generation of searchable audio segments, and supporting data mining.

Figure 19:
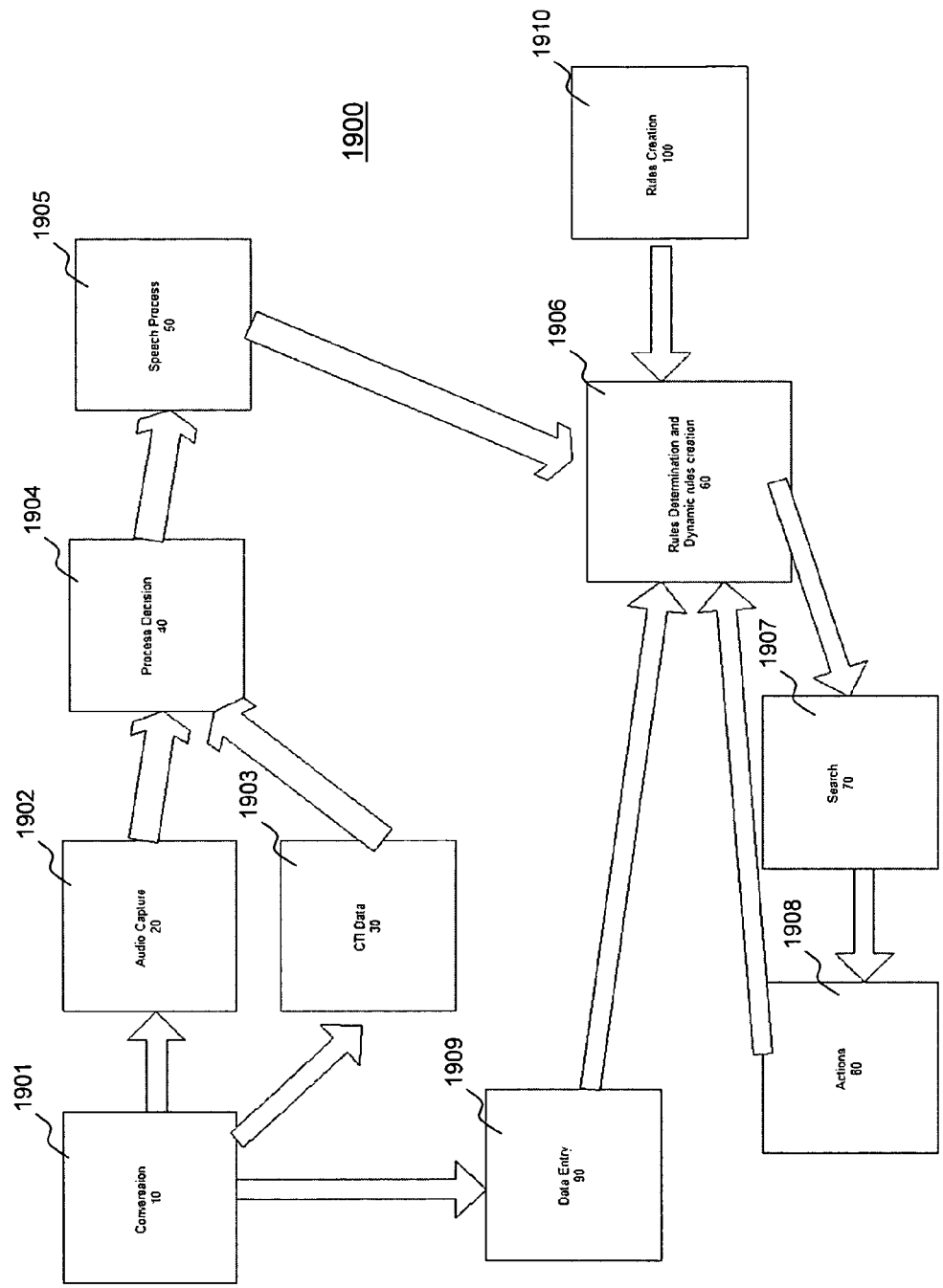
FIG. 19 is a flow diagram depicting a method of collecting, processing, organizing, and searching speech segments according to an embodiment of the invention.

A method for capturing and searching audio associated with respective calls is depicted in the flow chart of FIG. 19. As shown therein, a telephone conversation occurs at step 1901. This conversation may be carried over the public switched telephone network, or it may be over a data network using Voice over IP technology, or it may be a hybrid where some of the voice transmission is over the PSTN and some uses VOIP.

At step 1902, audio is captured from the conversation of step 1901 and a digital representation is made and stored within a computer system. If the recording is done through a digital PBX or a VOIP switch, then the capture may be accomplished through a direct data stream. Another option is an analog tap of a phone, in which case the voice is digitized as part of the process of making the recording. It is common for devices which record audio to compress the digital representation to conserve computer storage.

Step 1903 includes functionality provided by a CTI middleware product that can connect to a digital PBX or ACD and receive information associated with a call from the digital PBX or ACD. Although not a required component, it provides additional functionality. Examples of information that can be associated with a call are the callers number (CLID/ANI) the number dialed (DNIS) the local extension that received the call, and in the case of an ACD, the agent id of the person that handled the call.

When a new audio segment is available a decision is made at step 1904 whether that audio should be processed. If there is no CTI data some information may be provided by the recording device at 1902 such as which phone extension or trunk provided the audio. If the optional CTI interface is included, there is additional data as noted in connection with 1903. Using all available data logic is executed at 1904 and a decision is made about the audio segment. If the decision is to process the audio, then a reference to the audio and it's associated data is put in a queue for speech processing.

Speech processing 1905 is alerted when a reference to an audio segment is added to the queue, it invokes the speech engine to pre process the audio into an intermediate format. The intermediate format is a representation of the audio that is optimized for rapid searching. Some representations that are suitable for rapid searches are a statistical model of the phonemes or a text representation of the contents of the audio. Once the intermediate format is created, then rules determination is executed at 1906.

Data entry occurs at 1909. In a call center environment agents often enter data about a call into a computer system during the call. An example could be the length of a subscription. This is also not a required element. However, if data is collected in association with a call, then this data is also associated with an audio file and can be used to create dynamic rules at 1906.

A process for offline rules creation is provided at 1910. Such rules can be static or dynamic. Static rules are fully defined at rule creation time and do not involve any data elements that are only known at run time. An example of a static rule would be "generate an alert if at any time on the call there is at least a 70% confidence that the audio contains Take your business elsewhere". Dynamic rules contain some template information and the rule can only be fully formed when the audio and it's associated data is known. An example of a dynamic rule would be "Generate an alert if the audio does not contain "Thank you for calling my name is {agentid} how may I help you" where the name of the agent that is handling the call is substituted for {agentid}. A set of individual rules are then gathered into a rule set, and further logic is defined for a rule set to control when that set is applied. This logic can use any information that is known about an audio segment. According to a preferred embodiment, rules may contain some phrase that is to be used to search the audio, and this phrase is entered by typing into an interface. It should be noted that other methods of entering phrases, such as speaking them into the system may be employed in the future.

The logic processing according to 1906 is executed when an intermediate file is created. Rules determination considers the information known about the audio and determines which rules sets to apply to the audio. More than one rule set may be applied to a single instance of audio. If any of the applicable rules sets contain dynamic rules, then, at 1906, the data substitutions are made to create a rule applicable to the audio segment. There is a loop between steps 1906, 1907 and 1908. Since rules execution contains branching logic, the rules are executed in step 1906, but as part of that execution searches may be performed (step 1907) and corresponding actions may be initiated (step 1908). A speech queue is used to allow search requests (step 1907) to be performed by any available speech worker.

At step 1907 any searches required to support the rules execution are performed. Searches are performed against the intermediate file created at step 1905. If the intermediate format is a statistical model of the phonemes, then the search string must be represented as a set of probable phonemic representations of each word in the search string. If the search string was entered as text, a mapping of the text to a plurality of possible phoneme strings is performed in this step. (Note that a single text phrase may map to more than one symbolic representation.) If the intermediate file is text, then no format conversion is required. Once the intermediate file and search string are in a common format, a pattern match is performed, and a confidence is returned that the search pattern exists within the processed audio.

When a search is performed for a specific phrase by a speech process, a list of result hypotheses are returned from the speech recognition engine. Each result in the list is given an associated "confidence score" that indicates the probability that the result is, in fact, a correct result. The distribution of confidence scores is typically not uniform across all search phrases and therefore a "confidence threshold" value is determined for each search phrase that indicates what the lowest acceptable confidence threshold for a search result may be in order to be considered by the system to be a correct result.

The process of threshold determination is performed by first determining a set of calls that represent a test or training set. A specific phrase is selected, a search is performed, and the resulting list of result hypotheses will be returned. A human listener is then used to listen to the list of result hypotheses and to determine at what point in the result distribution that the confidence scores fail to be accurate. As the listener inspects search results, they are queued to the exact point in each call that the candidate result was located and allows the listener to only listen to a small portion of each call in order to determine the appropriate threshold.

As part of the rules processing actions can be initiated, such as creating an alert or incrementing a statistic. According to one embodiment, alerts and statistics may be stored in a relational database.

It should now be appreciated that the present invention provides advantageous methods and apparatus for audio data analysis and data mining using speech recognition.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, while embodiments of the invention have been described in connection with contact centers, CTI and other telephony based application, embodiments of the invention are equally applicable to other environments wherein speech, audio, and other real-time information may be collected, stored and processed for rapid searching. Thus, although the invention has been described in connection with various illustrated embodiments, numerous modifications and adaptations may be made thereto without departing from the spirit and scope of the invention as set forth in the claims. Furthermore, it should be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

What is claimed is:

1. A method of searching audio data, comprising:

defining search criteria containing both at least one search phrase to be used in searching contents of at least one audio segment and at least one data value representing information pertaining to said at least one audio segment;

using at least one computer to search a set of audio segments for said at least one search phrase and said at least one data value; and producing a set of results of occurrences of said at least one search phrase within said set of audio segments with information matching said at least one data value such that a given occurrence is a match for said search phrase within a minimum confidence level;

wherein said step of defining includes defining a plurality of search phrases, said step of searching includes searching said set of audio segments for said plurality of search phrases, and said step of producing includes producing a set of results of all audio segments including (i) at least one occurrence of a selected required one of said plurality of search phrases and (ii) non-occurrences of at least one selected forbidden one of said plurality of search phrases to be excluded from within said set of audio segments, said occurrence and non-occurrence determined with respect to said minimum confidence level that a given occurrence within said set of audio segments is a match for a corresponding one of said plurality of search phrases.

2. A method of searching audio data, comprising:

defining search criteria containing both at least one search phrase to be used in searching contents of at least one audio segment and at least one data value representing information pertaining to said at least one audio segment;

using at least one computer to search a set of audio segments for said at least one search phrase and said at least one data value; and producing a set of results of occurrences of said at least one search phrase within said set of audio segments with information matching said at least one data value such that a given occurrence is a match for said search phrase within a minimum confidence level;

wherein said defining includes defining a plurality of search phrases, said searching includes searching said set of audio segments for said plurality of search phrases, and said producing includes producing a set of results of all audio segments lacking occurrences of said plurality of search phrases identified in a specified temporal relationship within said set of audio segments with said minimum confidence level that a given occurrence within said set of audio segments is a match for a corresponding one of said plurality of search phrases.

3. The method according to claim 2 wherein said temporal relationship is with respect to said plurality of search phrases.

4. The method according to claim 2 wherein said temporal relationship is with respect to said set of audio segments segment.

5. A system for searching audio data comprising:
a programmable processor containing control logic operating to (i) define at least one search phrase used in searching contents of at least one audio segment and (ii) define a minimum confidence level for searching; and
at least one search engine operating to search a set of audio segments and intrinsic data associated therewith for (i) said at least one search phrase and (ii) ones of said audio segments satisfying match criteria for said intrinsic data and, in response, produce a set of results of all occurrences of said at least one search phrase within said set of audio segments satisfying said match criteria and said minimum confidence level that a given occurrence is a match for said at least one search phrase;
wherein said control logic is further operable to define a plurality of search phrases, said at least one search engine further operable to search said set of audio segments for said plurality of search phrases and produce a set of results of all audio segments including (i) at least one occurrence of a selected required one of said plurality of search phrases and (ii) non-occurrences of at least one selected forbidden one of said plurality of search phrases to be excluded from within said set of audio segments, said occurrence and non-occurrence determined with respect to said minimum confidence level that a given occurrence within said audio segments is a match for a corresponding one of said plurality of search phrases.

6. A system for searching audio data comprising:
a programmable processor containing control logic operating to (i) define at least one search phrase used in searching contents of at least one audio segment and (ii) define a minimum confidence level for searching; and
at least one search engine operating to search a set of audio segments and intrinsic data associated therewith for (i) said at least one search phrase and (ii) ones of said audio segments satisfying match criteria for said intrinsic data and, in response, produce a set of results of all occurrences of said at least one search phrase within said set of audio segments satisfying said match criteria and said minimum confidence level that a given occurrence is a match for said at least one search phrase;
wherein said control logic is operable to define a plurality of search phrases, said at least one search engine further operable to search said set of audio segments for said plurality of search phrases and produce a set of results of all audio segments lacking occurrences of said plurality of search phrases identified in a specified temporal relationship within said set of audio segments with said minimum confidence level that a given occurrence within said set of audio segments is a match for a corresponding one of said plurality of search phrases.

7. The system according to claim 6 wherein said temporal relationship is with respect to said plurality of search phrases.

8. The system according to claim 6 wherein said temporal relationship is with respect to said set of audio segments.

* * * * *